(12) United States Patent
Oh

(10) Patent No.: US 12,384,413 B2
(45) Date of Patent: Aug. 12, 2025

(54) VEHICLE DETERMINING A DRIVING ROUTE BASED ON PASS PRIORITY AND A METHOD FOR OPERATING THE VEHICLE

(71) Applicants: HYUNDAI MOTOR COMPANY, Seoul (KR); KIA CORPORATION, Seoul (KR)

(72) Inventor: Tae Dong Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 316 days.

(21) Appl. No.: 17/740,605

(22) Filed: May 10, 2022

(65) Prior Publication Data

US 2022/0410934 A1 Dec. 29, 2022

(30) Foreign Application Priority Data

Jun. 25, 2021 (KR) .................. 10-2021-0083393

(51) Int. Cl.
*B60W 60/00* (2020.01)

(52) U.S. Cl.
CPC ..... *B60W 60/0015* (2020.02); *B60W 2552/05* (2020.02); *B60W 2552/10* (2020.02); *B60W 2555/60* (2020.02); *B60W 2556/40* (2020.02)

(58) Field of Classification Search
CPC ......... B60W 60/0015; B60W 2552/05; B60W 2552/10; B60W 2555/60; B60W 2556/40; B60W 30/18154; B60W 60/0027; B60W 60/0011; B60W 30/08; B60W 30/09; B60W 30/0953; B60W 30/0956; B60W 30/18159; B60W 40/02; B60W 40/04; B60W 40/06;
(Continued)

(56) References Cited

U.S. PATENT DOCUMENTS 10,745,011 B2 * 8/2020 Zhao ................. B60W 30/0956
2016/0161270 A1 * 6/2016 Okumura ........... G08G 1/09675
701/23

(Continued)

OTHER PUBLICATIONS

Hale Law "Right of Way: U-turn Versus Right Turn-Who has the-right-of-way?", 2021 (Year: 2021).*

*Primary Examiner* — Anne Marie Antonucci
*Assistant Examiner* — Misa H Nguyen
(74) *Attorney, Agent, or Firm* — Lempia Summerfield Katz LLC

(57) ABSTRACT

A vehicle includes a position recognition module that creates position information, a road information combining module configured to create first precise map information including a driving route of the vehicle, an object combining module that creates second precise map information including a driving route of a surrounding vehicle around the present vehicle, a lane link determination module that selects, from the second precise map information, a lane link at which a first lane and a second lane intersect or join each other, a target determination module configured to determine a target vehicle, a pass priority determination module that determines a pass priority at which each of the present vehicle and the target vehicle passes through the lane link, an object route creation module that creates a driving route of the target vehicle, and an adaptive route determination module that determines an adaptive driving route of the present vehicle.

21 Claims, 17 Drawing Sheets

(58) Field of Classification Search
CPC ............... B60W 40/10; B60W 40/105; B60W 50/0097; B60W 50/0098; B60W 60/001; B60W 60/00272; B60W 60/00274; B60W 60/00276; B60W 2552/00; B60W 2554/402; B60W 2554/404; B60W 2554/4041; B60W 2554/4044; B60W 2554/80; B60W 30/095; B60W 2050/009; B60W 2520/10

See application file for complete search history.

(56) References Cited

U.S. PATENT DOCUMENTS

| | | | |
|---|---|---|---|
| 2018/0126983 A1* | 5/2018 | Beauvais | B60W 10/20 |
| 2019/0016338 A1* | 1/2019 | Ishioka | B60W 30/18163 |
| 2021/0122373 A1* | 4/2021 | Dax | B60W 60/0011 |
| 2022/0126822 A1* | 4/2022 | Wang | B60W 30/0956 |
| 2022/0340137 A1* | 10/2022 | Ollis | B60W 30/18154 |
| 2023/0419830 A1* | 12/2023 | Crane | G08G 1/096725 |

* cited by examiner

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND THE LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL (INCLUDING TRAVEL ENVIRONMENT/ VEHICLE DRIVING/LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND THE LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ LEVEL 2 SYSTEM MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND THE LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL AND TRAVEL ENVIRONMENT MONITORING (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

FIG. 1

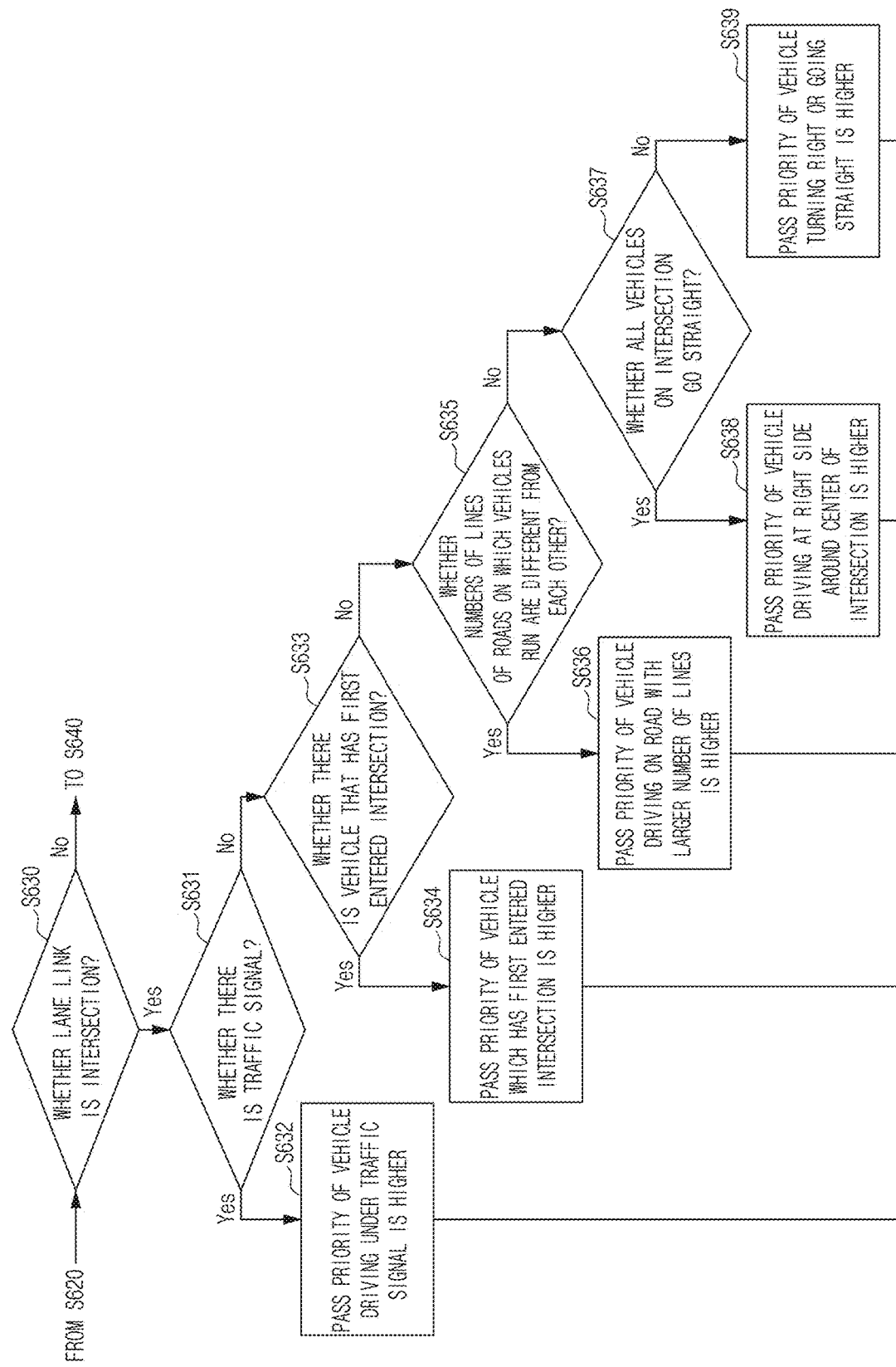

VEHICLE DETERMINING A DRIVING ROUTE BASED ON PASS PRIORITY AND A METHOD FOR OPERATING THE VEHICLE

CROSS-REFERENCE TO RELATED APPLICATION

This application claims the benefit of and priority to Korean Patent Application No. 10-2021-0083393, filed on Jun. 25, 2021, the entire contents of which are incorporated herein by reference.

TECHNICAL FIELD

The present disclosure relates to an autonomous driving vehicle that determines a driving route based on a pass priority and a method for operating the vehicle. More specifically, the present disclosure relates to an autonomous driving control scheme in which a pass priority of each of a present vehicle and a target vehicle is identified and a driving route of the present vehicle is determined based on the pass priority.

BACKGROUND

The statements in this section merely provide background information related to the present disclosure and do not necessarily constitute prior art.

An autonomous driving vehicle requires an ability to adaptively respond to changing circumstances in real time while driving.

In particular, the autonomous driving vehicle should compare a driving route of a present vehicle (that is, autonomous driving vehicle) with a driving route of a surrounding vehicle to determine an adaptive driving route of the present vehicle to inhibit or prevent collision between the present vehicle and the surrounding vehicle.

We have discovered that a conventional autonomous driving vehicle determines the adaptive driving route of the present vehicle based on only a possibility of collision between the present vehicle and the surrounding vehicle regardless of the pass priority, thereby causing a difference between vehicle driving by a driver and driving by an autonomous driving system, and thus causing inconvenience.

SUMMARY

The present disclosure has been made to solve the above-mentioned problems occurring in the prior art while advantages achieved by the prior art are maintained intact.

An autonomous driving vehicle may determine a driving route of a present vehicle based on a possibility of collision between the present vehicle and a surrounding vehicle. The autonomous driving vehicle may consider the possibility of collision between the present vehicle and the surrounding vehicle by predicting the driving route of the present vehicle and the driving route of the surrounding vehicle.

In the conventional autonomous driving vehicle, when the driving routes of the present vehicle and the surrounding vehicle overlap each other, interactions between vehicles such as the pass priority are not considered. Thus, a difference between a predicted driving route of the vehicle and an actual driving route thereof may occur.

Various embodiments disclosed in the present disclosure may provide a vehicle and a vehicle operating method for determining a target vehicle that is likely to collide with the present vehicle. Further, various embodiments disclosed in the present disclosure may provide a vehicle and a vehicle operating method for determining an adaptive driving route of the present vehicle based on a pass priority of the present vehicle and a pass priority of the target vehicle.

The technical problems to be solved by the present inventive concept are not limited to the aforementioned problems, and any other technical problems not mentioned herein would be clearly understood from the following description by those having ordinary skill in the art to which the present disclosure pertains.

According to an aspect of the present disclosure, a vehicle includes: a position recognition module that creates position information using map information and detected information collected by at least one sensor, where the detected information includes information about the vehicle (e.g., a present vehicle), and surrounding information (e.g., surrounding objects) around the present vehicle; a road information combining module that creates first precise map information including a driving route of the present vehicle based on the position information and the map information; an object combining module that creates second precise map information including a driving route of a surrounding vehicle around the present vehicle based on the detected information and the first precise map information; a lane link determination module that selects, from the second precise map information, a lane link at which a first lane belonging to the driving route of the present vehicle and a second lane belonging to the driving route of the surrounding vehicle intersect or join each other; a target determination module that determines, as a target vehicle, the surrounding vehicle that is likely to collide with the present vehicle among the surrounding vehicles passing through the lane link based on the second precise map information; a pass priority determination module that determines a pass priority at which each of the present vehicle and the target vehicle passes through the lane link based on the second precise map information; an object route creation module that creates a driving route of the target vehicle based on the second precise map information, the pass priority of the present vehicle, and the pass priority of the target vehicle; and an adaptive route determination module that determines an adaptive driving route of the present vehicle corresponding to the driving route of the target vehicle based on the second precise map information, the pass priority of the present vehicle, the pass priority of the target vehicle, and the driving route of the target vehicle.

Further, in accordance with one embodiment, the target determination module may determine the surrounding vehicle as the target vehicle when a difference between a first time-point at which the present vehicle has passed through the lane link and a second time-point at which the surrounding vehicle passes through the lane link is smaller than a first time duration, wherein the first time duration may be a maximum time duration for which the present vehicle is expected to be likely to collide with the surrounding vehicle.

Further, in accordance with one embodiment, the adaptive route determination module may determine a driving route in which the present vehicle and the target vehicle do not collide each other as an adaptive driving route of the present vehicle when the difference between the first time-point and the second time-point is smaller than a second time duration.

Further, in accordance with one embodiment, the pass priority determination module may determine the pass priority of the present vehicle and the pass priority of the surrounding vehicle when the difference between the first time-point and the second time-point is greater than or equal to the second time duration, and the difference between the first time-point and the second time-point is smaller than or equal to the first time duration.

Further, in accordance with one embodiment, the adaptive route determination module may determine a driving route that minimizes impact of the present vehicle due to collision as the adaptive driving route of the present vehicle when the difference between the first time-point and the second time-point is smaller than a third time duration, wherein the third time duration may be a minimum time duration for which the present vehicle does not collide with the target vehicle.

Further, in accordance with one embodiment, the second precise map information may include at least one of type information about the lane link, entry state information of the vehicle into the lane link, driving road information about the vehicle, or traffic signal information about the lane link.

Further, in accordance with one embodiment, when the lane link is a U-turn section, the pass priority determination module may determine that the pass priority of the vehicle that U-turns according to an U-turn signal is higher than a pass priority of each of other vehicles, and determine that the pass priority of the vehicle that U-turns without the U-turn signal is lower than the pass priority of each of other vehicles.

Further, in accordance with one embodiment, when the lane link is a join section, the pass priority determination module may determine that a pass priority of a vehicle joining the join section from a road without a yield sign is higher than a pass priority of a vehicle joining the join section from a road with a yield sign.

Further, in accordance with one embodiment, when the yield sign is absent, the pass priority determination module may determine that a pass priority of a vehicle joining the join section from a main road is higher than a pass priority of a vehicle joining the join section from a join road.

Further, in accordance with one embodiment, when the lane link is an intersection having a traffic signal, the pass priority determination module may determine that a pass priority of a vehicle driving under the traffic signal is higher than a pass priority of a vehicle driving not under the traffic signal.

Further, in accordance with one embodiment, when the lane link is an intersection free of a traffic signal, the pass priority determination module may determine that a pass priority of a vehicle which has first entered the intersection is higher than a pass priority of a vehicle which has later entered the intersection.

Further, in accordance with one embodiment, when vehicles enter the intersection at the same time, or any vehicle does not enter the intersection, the pass priority determination module may determine that a pass priority of a vehicle driving on a road having a larger number of lanes is higher than a pass priority of a vehicle driving on a road having a smaller number of lanes.

Further, in accordance with one embodiment, when the vehicles respectively drive on roads having the same number of the lines, the pass priority determination module may determine that a pass priority of a vehicle turning right or going straight is higher than a pass priority of a vehicle turning left.

Further, in accordance with one embodiment, when all of the vehicles go straight, the pass priority determination module may determine that a pass priority of a vehicle driving at a right side around a center of the intersection is higher than a pass priority of a vehicle driving at a left side around the center of the intersection.

Further, in accordance with one embodiment, when the lane link is a rotary, the pass priority determination module may determine that a pass priority of a vehicle which is entering the rotary is higher than a pass priority of a vehicle which has entered the rotary.

Further, in accordance with one embodiment, when the lane link is a roundabout, the pass priority determination module may determine that a pass priority of a vehicle rotating in the roundabout is higher than a pass priority of a vehicle entering the roundabout.

Further, in accordance with one embodiment, when the pass priority of the present vehicle is higher than the pass priority of the target vehicle, the object route creation module may apply deceleration of the target vehicle to the second precise map information to create the driving route of the target vehicle.

Further, in accordance with one embodiment, the adaptive route determination module may determine the driving route of the present vehicle as the adaptive driving route of the present vehicle.

Further, in accordance with one embodiment, when the target vehicle drives not under the driving route of the target vehicle, the adaptive route determination module may determine the adaptive driving route of the present vehicle, based on a first time-point at which the present vehicle has passed through the lane link, and a third time-point at which a target vehicle that does not follow the driving route of the target vehicle has passed through the lane link.

Further, in accordance with one embodiment, when the pass priority of the present vehicle is lower than the pass priority of the target vehicle, the object route creation module may create the driving route of the surrounding vehicle contained in the second precise map information as the driving route of the target vehicle.

Further, in accordance with one embodiment, the adaptive route determination module may apply deceleration of the present vehicle to the second precise map information to determine the adaptive driving route of the present vehicle.

According to an aspect of the present disclosure. a method for operating a vehicle includes creating, by a position recognition module, position information using map information, and detected information about the vehicle as a present vehicle, and a surrounding object around the present vehicle, creating, by a road information combining module, first precise map information including a driving route of the present vehicle, based on the position information and the map information, creating, by an object combining module, second precise map information including a driving route of a surrounding vehicle around the present vehicle, based on the detected information and the first precise map information, selecting, by a lane link determination module, from the second precise map information, a lane link at which a first lane belonging to the driving route of the present vehicle and a second lane belonging to the driving route of the surrounding vehicle intersect or join each other, determining, by a target determination module, as a target vehicle, the surrounding vehicle that is likely to collide with the present vehicle among the surrounding vehicles passing through the lane link, based on the second precise map information, determining, by a pass priority determination module, a pass priority at which each of the present vehicle and the target vehicle passes through the lane link, based on the second precise map information, creating, by an object route creation module, a driving route of the target vehicle, based on the second precise map information, the pass priority of the present vehicle, and the pass priority of the target vehicle, and determining, by an adaptive route determination module, an adaptive driving route of the present vehicle corresponding to the driving route of the target vehicle, based on the second precise map information, the pass priority of the present vehicle, the pass priority of the target vehicle, and the driving route of the target vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and advantages of the present disclosure would be more apparent from the following detailed description taken in conjunction with the accompanying drawings:

FIG. 1 is a table where an automation level of an autonomous driving vehicle is defined;

FIGS. 7A to 7E show a pass priority determination method based on a type of a lane link according to one embodiment of the present disclosure;

Figure 2:
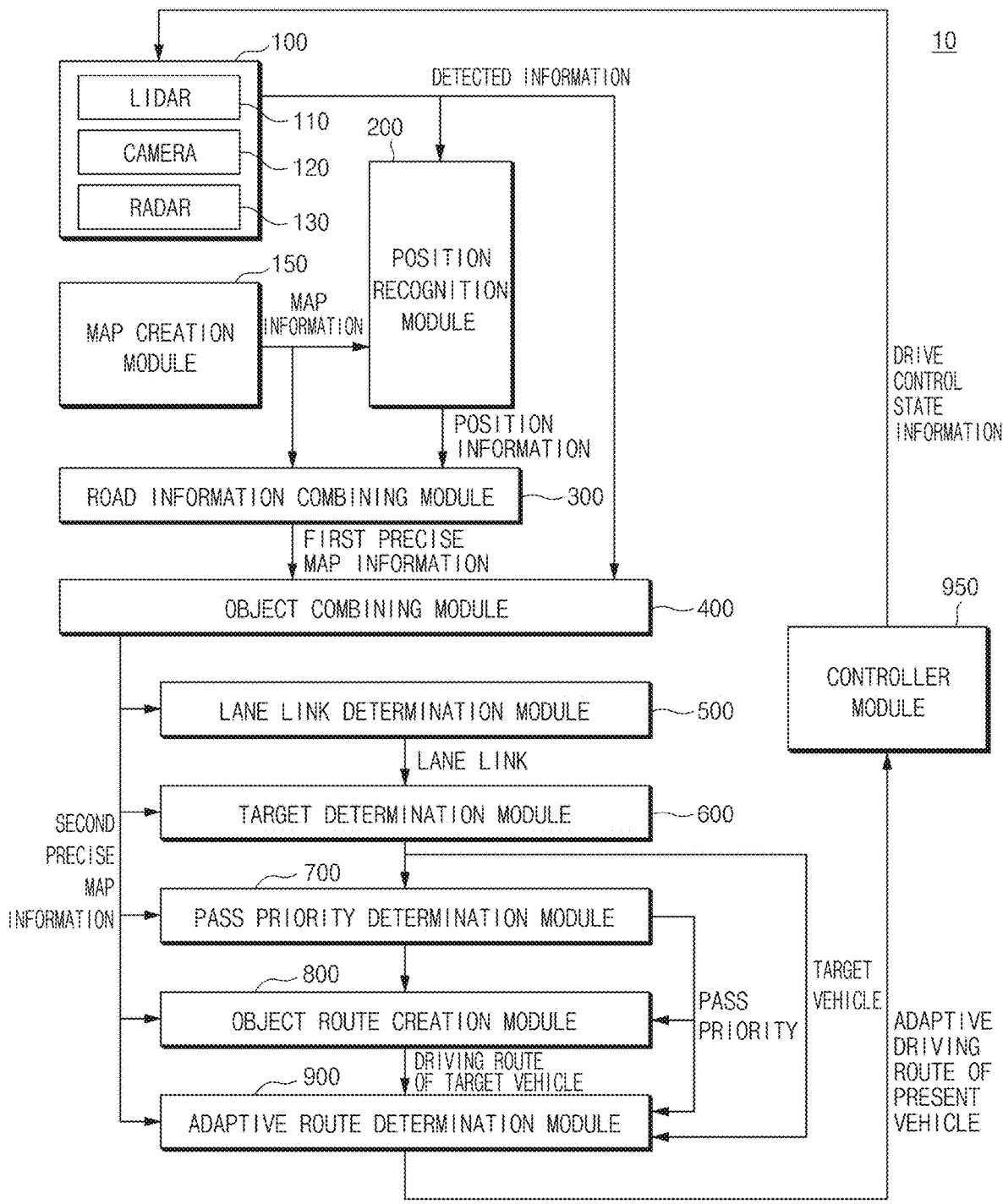
FIG. 2 is a block diagram showing a configuration of a vehicle according to one embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions is ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a table in which automation levels of an autonomous driving vehicle are defined.

The autonomous vehicle refers to a vehicle that recognizes a travel environment by itself to determine a risk, minimizes travel manipulation of a driver while controlling a travel route, and drives by itself.

Ultimately, the autonomous vehicle refers to a vehicle capable of traveling, controlling, and parking without an influence of humans, and is focused on a vehicle in a state in which an autonomous driving technology, which is a core foundation of the autonomous driving vehicle, —that is, an ability to operate the vehicle without active control or monitoring of the driver is the most advanced.

Referring to FIG. 1, in an automation step level 0 to 2, the travel environment is monitored by the driver. On the other hand, in an automation step level 3 to 5, the travel environment is monitored by an automated travel system.

However, a concept of the autonomous vehicle currently being released may include an automation step of an intermediate step to the autonomous vehicle in a full sense, and corresponds to a goal-oriented concept on the premise of mass production and commercialization of a fully autonomous vehicle.

An autonomous driving control method according to the present disclosure may be applied to an autonomous vehicle corresponding to the level 2 (partial autonomous driving) and the level 3 (conditional autonomous driving) among automation steps of the autonomous driving shown in FIG. 1. However, the present disclosure may not be necessarily limited thereto, and the autonomous driving control method may be applied to an autonomous vehicle supporting a plurality of various automation steps.

The automation level of the autonomous vehicle based on the society of automotive engineers (SAE), which is an American association of automotive Engineers, may be classified as shown in the table in FIG. 1.

FIG. 2 is a block diagram showing a configuration of a vehicle 10 according to one embodiment of the present disclosure.

According to FIG. 2, the vehicle 10 may include: a sensor module 100 that creates detected information about the vehicle 10 and a surrounding thereof, a map creation module 150 that creates map information, a position recognition module 200 that creates position information based on the detected information and the map information, a road information combining module 300 which creates first precise map information including a driving route of the vehicle 10, an object combining module 400 that creates second precise map information including a driving route of a surrounding vehicle, a lane link determination module 500 for selecting, from the second precise map information, a lane link at which a first lane belonging to the driving route of the vehicle 10 and a second lane belonging to the driving route of the surrounding vehicle intersect or join each other, a target determination module 600 for determining, as a target vehicle, the surrounding vehicle having a possibility to collide with the vehicle 10 among the surrounding vehicles passing through the lane link, an object route creation module 800 for creating a driving route of the target vehicle, and an adaptive route determination module 900 for determining an adaptive driving route of the vehicle 10 corresponding to the driving route of the target vehicle, and a controller module 950.

Each of the sensor module 100, the map creation module 150, the position recognition module 200, the road information combining module 300, the object combining module 400, the lane link determination module 500, the target determination module 600, a pass priority determination module 700, the object route creation module 800, the adaptive route determination module 900 and the controller module 950 as shown in FIG. 2 may include a processor (not shown) and a memory (not shown). The processor (not shown) may control each of the components. Further, the memory (not shown) may store therein data for controlling each of the components.

The processor (not shown) and the memory (not shown) may be individually included in the components (e.g., sensor module 100, map creation module 150, position recognition module 200, road information combining module 300, object combining module 400 lane link determination module 500, target determination module 600, the pass priority determination module 700, object route creation module 800, adaptive route determination module 900, and controller module 950) belonging to the vehicle 10.

Further, in another embodiment, the processor (not shown) and the memory (not shown) may be included in the vehicle 10 and may integrally perform control and data storage related to each of the components (e.g., sensor module 100, map creation module 150, position recognition module 200, road information combining module 300, object combining module 400 lane link determination module 500, target determination module 600, the pass priority determination module 700, object route creation module 800, adaptive route determination module 900, and controller module 950) belonging to the vehicle 10.

Hereinafter, for convenience of description, the vehicle 10 according to one embodiment of the present disclosure is referred to as the present vehicle 10, and another vehicle around the present vehicle 10 is referred as a surrounding vehicle.

The sensor module 100 may be a module including a plurality of sensors. The sensor module 100 may collect information about an external environment around the present vehicle 10 and a driving state of the present vehicle 10 to create the detected information.

The detected information may include, for example, road information about a road on which the present vehicle 10 runs, lane information about a lane in which the present vehicle 10 runs, information about a lane intersecting with the driving lane of the present vehicle 10, information about a surrounding object around the present vehicle 10, driving speed information about the present vehicle 10, information about an operating state of the present vehicle 10, information about a behavioral state of the present vehicle 10, etc.

The information on the external environment around the present vehicle 10 may include, for example, a driving lane in which each of the surrounding vehicles around the present vehicle 10 is traveling, a driving speed of each of the surrounding vehicles, a position of each of the surrounding vehicles, and a distance between the present vehicle 10 and each of the surrounding vehicles. Further, the information on the external environment around the present vehicle 10 may include information on a type of a lane in which present vehicle 10 drives, information about a road on which the surrounding vehicle around present vehicle 10 runs, and traffic signal information on the lane in which the present vehicle 10 drives.

In other words, the information on the external environment around the present vehicle 10 may mean information on all objects within a range where the sensor module 100 of the present vehicle 10 may collect information. The sensor module 100 may create the detected information about the surrounding object around the present vehicle 10 based on the collected information.

The sensor module 100 may receive information about the drive control state of the present vehicle 10 from the controller module 950 of the present vehicle 10, and the received information is used as a basis for creating the detected information. The information on the drive control state of the present vehicle 10 may include information about a torque state of the present vehicle 10, a braking state of the present vehicle 10, and a steering state of the present vehicle 10. The sensor module 100 may create the detected information about the present vehicle 10 based on the information on the drive control state of the present vehicle 10 as received. The created detected information may be sent to the position recognition module 200 that creates the position information.

The controller module 950 of the present vehicle 10 may include, for example, a torque controller for controlling a drive torque of the present vehicle 10, a braking controller for controlling a braking of the present vehicle 10, and an integrated controller for controlling an electronic device belonging to the present vehicle 10 (e.g., a body control module and a steering controller that controls a driving direction of the present vehicle 10). The controllers are general in-vehicle devices for controlling the present vehicle 10, and detailed descriptions thereof are omitted.

According to another embodiment, the sensor module 100 may collect information about the surrounding object around the present vehicle 10, and may transmit the detected information created based on the collected information to the position recognition module 200. The detected information about the present vehicle 10 may be transmitted from the controller module 950 to the position recognition module 200.

The sensor module 100 may include at least one of a LIDAR sensor 110, a camera 120, or a radar sensor 130. The sensor module 100 may collect information about a road on which the present vehicle 10 drives, information about a lane in which the present vehicle 10 drives, information on a lane intersecting the driving lane of the present vehicle 10, and information about the objects around the present vehicle 10 using the LIDAR sensor 110, the camera 120 and the radar sensor 130.

The LIDAR sensor 110 may detect the objects around the present vehicle 10. The LIDAR sensor 110 may detect objects in front, rear, and side of the present vehicle 10, and may calculate a distance between the detected object and the present vehicle 10. The LIDAR sensor 110 may measure a speed of the detected object. When the detected object is the surrounding vehicle, the LIDAR sensor 110 may calculate the position and the driving speed of the surrounding vehicle.

Further, the LIDAR sensor 110 may detect a terrain and a facility state around the present vehicle 10.

The camera 120 may take an image of a scene out of the present vehicle 10. The present vehicle 10 may collect information about the driving lane of the present vehicle 10, the object position around the present vehicle 10, and the driving lane of the surrounding vehicle that intersects with the driving lane of the present vehicle 10, based on the image collected by the camera 120. Further, the present vehicle 10 may detect a type of the lane in which the present vehicle 10 drives and the state of facilities (for example, a traffic signal light and a bulletin) positioned around the lane using the camera 120.

The radar sensor 130 may use ultrasonic radar by way of example. Together with the LIDAR sensor 110, the radar sensor 130 may detect objects around the present vehicle 10. The radar sensor 130 may have a detection range and a detection speed different from those of the LIDAR sensor 110. According to one embodiment, the radar sensor 130 may supplement sensing characteristics of the LIDAR sensor 110.

The sensor module 100 may create detected information about the present vehicle 10 and the surrounding objects around the present vehicle 10 based on the information acquired by the sensors.

The map creation module 150 may create map information acting as a basis for position information creation. The map creation module 150 may include a GPS receiver (not shown), and may receive a positioning signal from a positioning satellite via the GPS receiver (not shown). The map creation module 150 may create map information including geographic information about the present vehicle 10 based on the received positioning signal.

In another embodiment, the map creation module 150 may create map information based on information received from things on which an infrastructure is built, such as the surrounding vehicle and the road, via a vehicle-to-everything (V2X) communication. In another embodiment, the map creation module 150 may create map information based on navigation information, GPS information, and information collected by the sensor module 100.

The position recognition module 200 may create the position information using the detected information received from the sensor module 100 and the map information received from the map creation module 150.

The detected information received by the position recognition module 200 may include detected information about the present vehicle 10 and detected information about the surrounding object around the present vehicle 10.

As described above, the position recognition module 200 may receive the detected information about the present vehicle 10 and the surrounding object around the present vehicle 10 from the sensor module 100. Alternatively, according to an embodiment, the position recognition module 200 may receive the detected information about the present vehicle 10 from the controller module 950 belonging to the present vehicle 10.

The position recognition module 200 may create the position information using the map information, the detected information about the present vehicle 10, and the detected information about the surrounding object around the present vehicle 10. The position information may include the position of the present vehicle 10 and the position of each of the objects around the present vehicle 10.

The position information may include information about an absolute position of each of the present vehicle 10 and the surrounding objects on the map information. Further, the position information may include information about a relative position between the present vehicle 10 and each of the objects around the present vehicle 10.

The position information may include information about a matching percentage between an actual position of the present vehicle 10 and a position of the present vehicle 10 on the map information. Further, the position information may include information about a matching percentage between an actual position of each of the objects around the present vehicle 10 and the position of each of the objects around the present vehicle 10 on the map information.

When the matching percentage is smaller than a preset value, the position recognition module 200 may request retransmission of the map information and the detected information, and may re-create the position information, based on the retransmitted map information and detected information.

The road information combining module 300 may create the first precise map information including the driving route of the present vehicle 10 based on the position information and the map information.

The driving route of the present vehicle 10 may mean a route along which the present vehicle 10 drives from the current position of the present vehicle 10 to a destination of the present vehicle 10. The driving route of the present vehicle 10 may be updated at a preset interval. The driving route of the present vehicle 10 may include information on a speed, a direction, a to-be-used-road, and a driving line of the present vehicle 10.

According to one embodiment, the driving route of the present vehicle 10 may be created based on the position information and according to a preset period. The first precise map information may include the driving route of the present vehicle 10 and the position information of each of the objects surrounding the present vehicle 10.

The first precise map information may be information indicating the driving route of the present vehicle 10 on the map information.

The driving route of the present vehicle 10 may be a driving route based on a current speed of the present vehicle 10, a current position of the present vehicle 10, the destination of the present vehicle 10, and the position information about each of the objects around the present vehicle 10.

The road information combining module 300 may calculate a position change of the present vehicle 10, based on the position information, and may apply the change in the position of the present vehicle 10 to the map information to create the first precise map information including the driving route of the present vehicle 10. The driving route of the present vehicle 10 may be a route based on the map information and the detected information regarding the surrounding object around the present vehicle 10. The driving route of the present vehicle 10 may include information on the lane in which the present vehicle drives.

The object combining module 400 may create the second precise map information including the driving route of the surrounding vehicle based on the detected information and the first precise map information. The surrounding vehicles may mean vehicles among objects around the present vehicle 10. According to one embodiment, the surrounding vehicles may be vehicles within a range in which the present vehicle 10 may collect the detected information about the objects around the present vehicle 10. In other words, the surrounding vehicle may be a vehicle within the detection range of the sensor module 100 of the present vehicle 10.

According to one embodiment, the second precise map information may include the driving route of the present vehicle 10 and the driving route of the surrounding vehicle. The driving route of the surrounding vehicle may mean a route along which the surrounding vehicle drives for a preset time duration from the current position of the surrounding vehicle. The driving route of the surrounding vehicle may include information on a speed, the direction, a to-be-used-road, and a driving line of the surrounding vehicle.

The preset time duration may correspond to a driving route update period of the present vehicle 10. The driving route of the surrounding vehicle may be a route based on the map information and the detected information regarding the surrounding object around the present vehicle 10. The driving route of the surrounding vehicle may include information about the lane in which the surrounding vehicle drives.

The second precise map information may be information indicating the driving route of each of the present vehicle 10 and the surrounding vehicle on the map information.

The lane link determination module 500 may select, from the second precise map information, a point at which the first lane belonging to the driving route of the present vehicle 10 and the second lane belonging to the driving route of the surrounding vehicle intersect or join each other.

According to one embodiment, the point at where the first lane belonging to the driving route of the present vehicle 10 and the second lane belonging to the driving route of the surrounding vehicle intersect or join each other may be referred to a lane link.

The first lane and the second lane intersecting or joining each other at the lane link may mean that at least a portion of the driving route of the present vehicle 10 is shared or coincident with at least a portion of the driving route of the surrounding vehicle at the lane link.

According to one embodiment, the lane link determination module 500 may select all of points at which the first lane and the second lane intersect or join each other as lane links. Then, the lane link determination module 500 may determine an order from a first lane link which the present vehicle 10 first reaches to a last lane link which the present vehicle 10 lastly reaches along the driving route of the present vehicle 10 among the selected lane links.

Based on the second precise map information, the target determination module 600 may determine, as the target vehicle, the surrounding vehicle that is likely to collide with the present vehicle 10 among the surrounding vehicles passing through the lane link.

According to one embodiment, the target determination module 600 may determine whether the surrounding vehicle passing the lane link which the present vehicle 10 first reaches from a current time-point, based on the driving route of the present vehicle 10 corresponds to the target vehicle.

The target determination module 600 may determine the target vehicle based on time-points at which the present vehicle 10 and the surrounding vehicle pass through the lane link, respectively.

For example, when the time-point at which the present vehicle 10 has passed through the lane link is a first time-point, and the time-point at which the surrounding vehicle passes through the lane link is a second time-point, the target determination module 600 may determine the target vehicle, based on a difference between the first time-point and the second time-point.

The pass priority determination module 700 may determine a lane link pass priority of each of the present vehicle 10 and the target vehicle, based on the second precise map information.

The pass priority may mean a right to first pass the lane link. According to one embodiment, the pass priority may be determined based on a type of the lane link, a vehicle's entry state into the lane link, the driving road of the vehicle, traffic signal information related to the lane link, and the like.

The type of the lane link, the vehicle's entry state into the lane link, the vehicle's driving road, and the traffic signal information related to the lane link may be included in the second precise map information.

The object route creation module 800 may create a driving route of the target vehicle based on the second precise map information, the pass priority of the present vehicle 10, and the pass priority of the target vehicle.

According to one embodiment, the driving route of the target vehicle may be different from the driving route of the surrounding vehicle previously calculated by the object combining module 400, based on the pass priority of the present vehicle 10 and the pass priority of the target vehicle.

For example, when the pass priority of the target vehicle is lower than the pass priority of the present vehicle 10, the object route creation module 800 may apply deceleration of the target vehicle to the driving route of the surrounding vehicle as previously calculated to create the driving route of the target vehicle.

The adaptive route determination module 900 may determine an adaptive driving route of the present vehicle corresponding to the driving route of the target vehicle, based on the second precise map information, the pass priority of the present vehicle, the pass priority of the target vehicle, and the driving route of the target vehicle.

According to one embodiment, the adaptive driving route of the present vehicle 10 may be different from the driving route of the present vehicle 10 as previously calculated by the road information combining module 300, based on the pass priority of the present vehicle 10 and the pass priority of the target vehicle.

For example, when the pass priority of the target vehicle is higher than the pass priority of the present vehicle 10, the adaptive route determination module 900 may apply the deceleration of the present vehicle 10 to the driving route of the present vehicle 10 as calculated previously to determine the adaptive driving route of the vehicle 10.

Further, the adaptive route determination module 900 may determine the adaptive driving route of the present vehicle 10, based on a difference between lane link pass-through time-points of the present vehicle 10 and the surrounding vehicle.

For example, when the difference between the lane link pass-through time-point of the present vehicle 10 and the lane link pass-through time-point of the surrounding vehicle is smaller than a second time duration, the adaptive route determination module 900 may determine a driving route along which the present vehicle 10 and the target vehicle do not collide each other as the adaptive driving route of the present vehicle. In this case, the second time duration may be a minimum time duration for which the pass priority of each of the present vehicle 10 and the target vehicle is determined.

The controller module 950 may include controllers belonging to the vehicle to control the driving of the present vehicle 10. For example, the controller module 950 may include a steering controller (not shown) for controlling the direction of the present vehicle 10, a shift controller (not shown) for controlling the shift of the present vehicle 10, and a drive controller (not shown) for controlling the drive torque of the present vehicle 10, and a braking controller (not shown) that controls the braking of the present vehicle 10.

Figure 3:
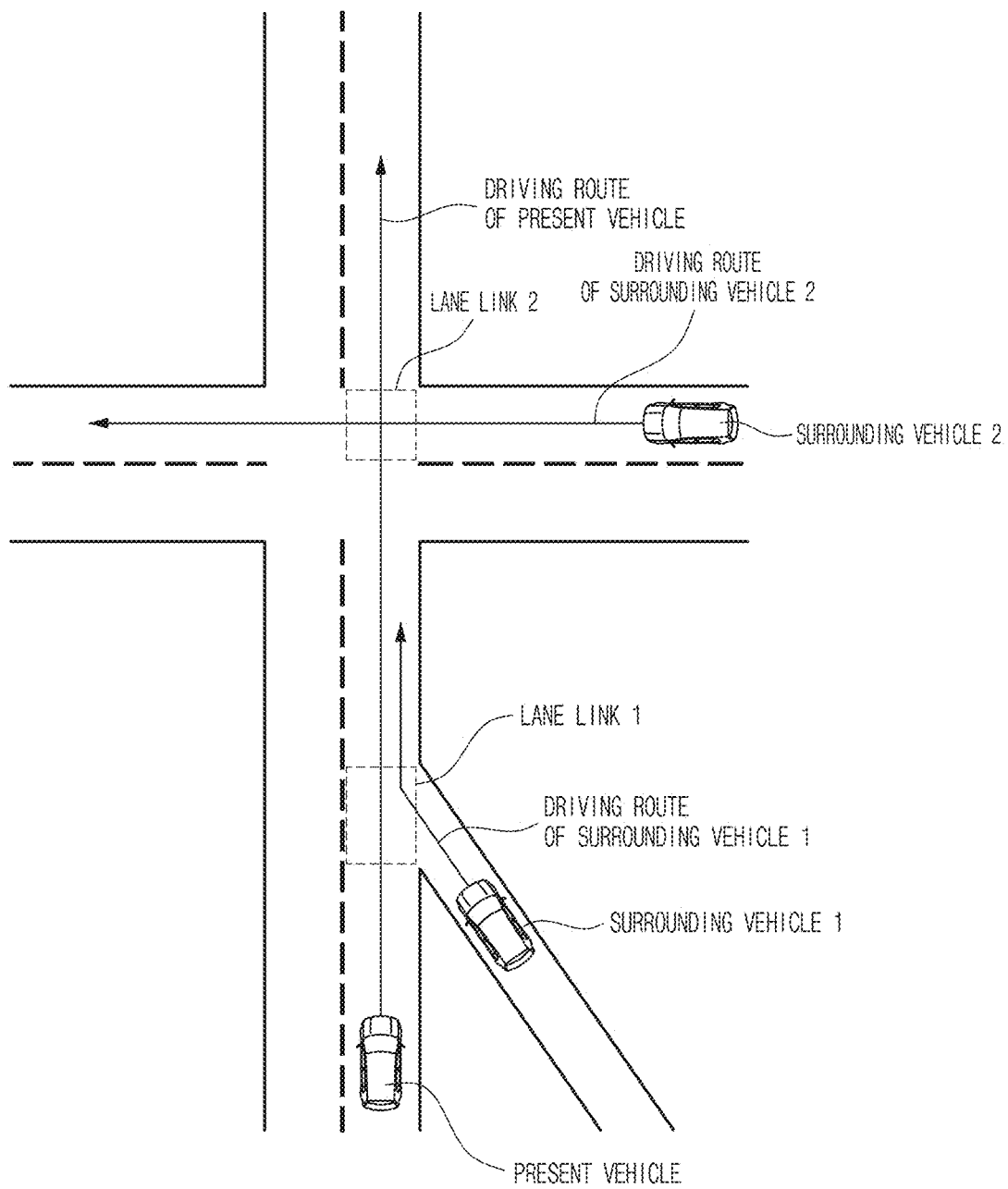
FIG. 3 shows a present vehicle, lane links, and surrounding vehicles according to one embodiment of the present disclosure.

The controller module 950 may receive drive control state information about the present vehicle 10 from the controllers, and may send the drive control state information to the sensor module 100. Further, the controller module 950 may receive the adaptive driving route of the present vehicle 10 from the adaptive route determination module 900, and may output control parameters for the controllers such that the vehicle 10 may travel along an adaptive driving route. FIG. 3 shows the present vehicle 10, the lane link and the surrounding vehicle according to one embodiment of the present disclosure.

The road information combining module 300 may create the first precise map information including the driving route of the present vehicle 10 based on the position information and the map information. The present vehicle 10 may travel along the driving route. As described above, the driving route may include information about the speed, the driving line, and the driving road of the present vehicle 10.

The object combining module 400 may create the second precise map information including the driving route of the surrounding vehicle based on the detected information and the first precise map information.

The lane link determination module 500 may select a lane link at which the first lane belonging to the driving route of the present vehicle and the second lane belonging to the driving route of the surrounding vehicle intersect or join each other.

According to FIG. 3, a lane link 1 may be a lane link which the first lane belonging to the driving route of the present vehicle and the second lane belonging to the driving route of a surrounding vehicle 1 join each other. Further, a lane link 2 may be a lane link at which the first lane belonging to the driving route of the present vehicle and the second lane belonging to the driving route of a surrounding vehicle 2 intersect each other.

The lane link 1 may be referred to as a join section while the lane link 2 may be referred to as an intersection. However, this is only an example. The lane links may include not only the join section and the intersection, but also a U-turn section, a rotary and a roundabout.

Figure 4:
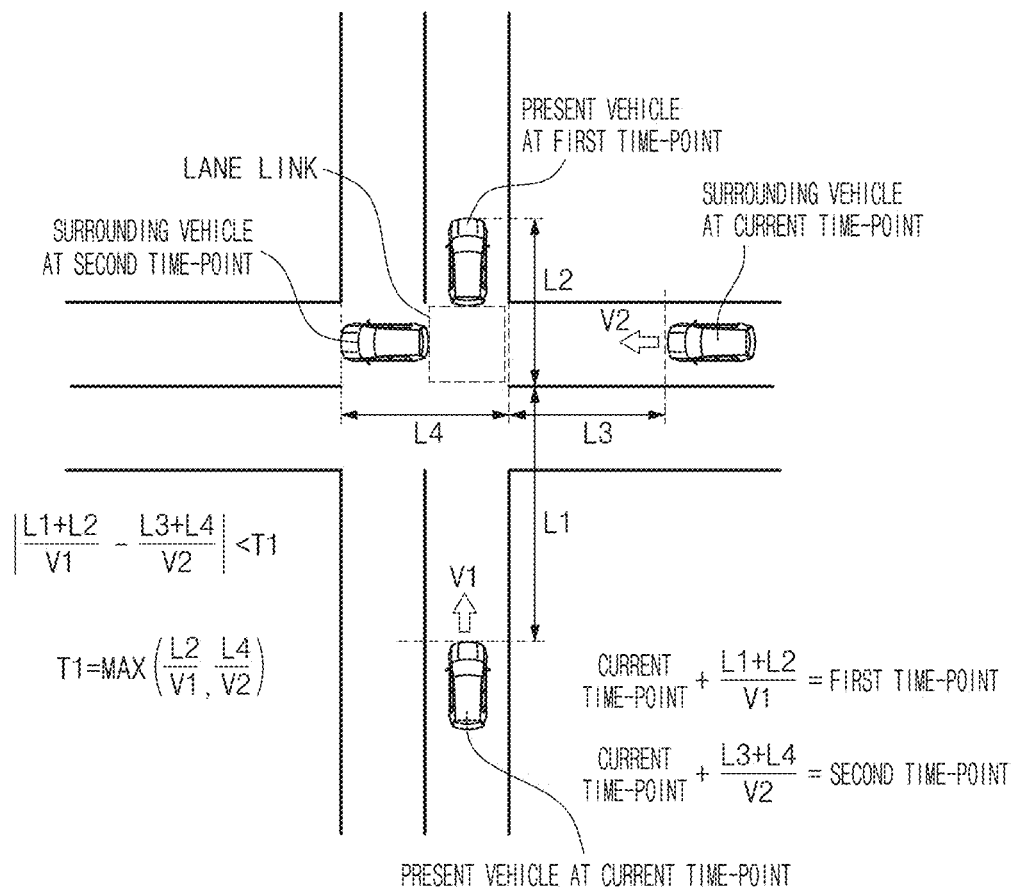
FIG. 4 is a diagram to illustrate a method for determining a target vehicle according to one embodiment of the present disclosure.

FIG. 4 is a diagram to illustrate a method for determining a target vehicle according to one embodiment of the present disclosure.

The lane link as shown in FIG. 4 may be an intersection, but this may be only exemplary. The same target vehicle determination method may be applied to the join section, the U-turn section, the rotary and the roundabout, etc.

FIG. 4 shows a situation where the driving route of the present vehicle and the driving route of the surrounding vehicle intersect each other by way of example.

FIG. 4 shows a position of the present vehicle at a current time-point, a position of the present vehicle at a first time-point, a position of the surrounding vehicle at a current time-point, and a position of the surrounding vehicle at a second time-point.

The first time-point may mean a time-point at which the present vehicle has completely passed through the lane link. The first time-point may be calculated based on a value obtained by dividing a distance between a current position of the present vehicle 10 and a point at which the lane link ends on the driving route of the present vehicle 10 by a current speed of the present vehicle 10. The first time-point may be a time-point at which the present vehicle 10 has completely passed through the lane link.

Further, the second time-point may mean a time-point at which the surrounding vehicle has completely passed through the lane link. The second time-point may be calculated based on a value obtained by dividing a distance between a current position of the surrounding vehicle and a point where the lane link ends on the driving route of the surrounding vehicle by a current speed of the surrounding vehicle. The second time-point may be a time-point at which the surrounding vehicle has completely deviated from the lane link.

The present vehicle may travel by a first distance L1 before reaching the lane link. Further, the present vehicle may reach the lane link, and enter the lane link, and then may travel by a second distance L2 until the present vehicle has completely passed through the lane link.

The surrounding vehicle may travel by a third distance L3 until reaching the lane link. Further, the surrounding vehicle may reach the lane link, and may enter the lane link, and then may travel by a fourth distance L4 until the surrounding vehicle has completely passed through the lane link.

When the present vehicle is driving at a first speed V1 at the current time-point, it may be assumed that the present vehicle maintains the first speed V1 until the present vehicle has passed the lane link. Similarly, when the surrounding vehicle is driving at second speed V2 at the current time-point, it may be assumed that the surrounding vehicle maintains the second speed V2 until the surrounding vehicle has passed the lane link.

When the time-point at which the present vehicle has passed through the lane link is referred to as the first time-point, the first time-point may be a time-point to which the current time-point shifts by a time duration for which the present vehicle moves by a sum of the first distance L1 and the second distance L2.

Similarly, when the time-point at which the surrounding vehicle has passed through the lane link is referred to as the second time-point, the second time-point may be a time-point by which the current time-point shifts by a time duration for which the surrounding vehicle moves by a sum of the third distance L3 and the fourth distance L4.

When the difference $|(L1+L2)/V1-(L3+L4)/V2|$ between the first time-point and the second time-point is smaller than or equal to a first time duration T1, the target determination module 600 may determine the surrounding vehicle as the target vehicle. The first time duration T1 may be a maximum time duration for which each of the present vehicle and the surrounding vehicle is expected to have a possibility of colliding with each other.

According to one embodiment, the first time duration may be the maximum time duration for which the present vehicle 10 is expected to have a possibility of colliding with the surrounding vehicle. According to another embodiment, the first time duration may be the maximum time duration for which the present vehicle 10 and the surrounding vehicle occupy the lane link at the same time.

For example, the first time duration T1 may be a larger one among a time duration for which the present vehicle enters the lane link and then has completely passed through the lane link and a time duration for which the surrounding vehicle enters the lane link and then has completely passed through the lane link after.

The time duration for which the present vehicle 10 has completely passed through the lane link may vary depending on the type of the lane link, a size (for example, a length and a width) of the present vehicle 10, and the current speed of the present vehicle 10. Similarly, the time duration for which the surrounding vehicle has completely passed through the lane link may vary depending on the type of the lane link, a size (for example, a length and a width) of the surrounding vehicle, and the current speed of the surrounding vehicle.

According to one embodiment, the time-point (first time-point) at which the present vehicle 10 has passed through the lane link and the time-point (second time-point) at which the surrounding vehicle has passed through the lane link may be calculated based on the driving route of the present vehicle 10 and the driving route of the surrounding vehicle contained in the second precise map.

For example, the first time duration may be approximated to a larger one among a value obtained by dividing a distance of the lane link in the driving route of the present vehicle 10 by the current speed of the present vehicle 10, or a value obtained by dividing a distance of the lane link in the driving route of the surrounding vehicle by the current speed of the surrounding vehicle.

In other words, assuming that the present vehicle 10 maintains the first speed V1 until the present vehicle 10 has completely passed through the lane link, and that the surrounding vehicle maintains the second speed V2 until the surrounding vehicle has completely passed through the lane link, the first time duration may be a larger value among L2/V1 and L4/V2.

Figure 5:
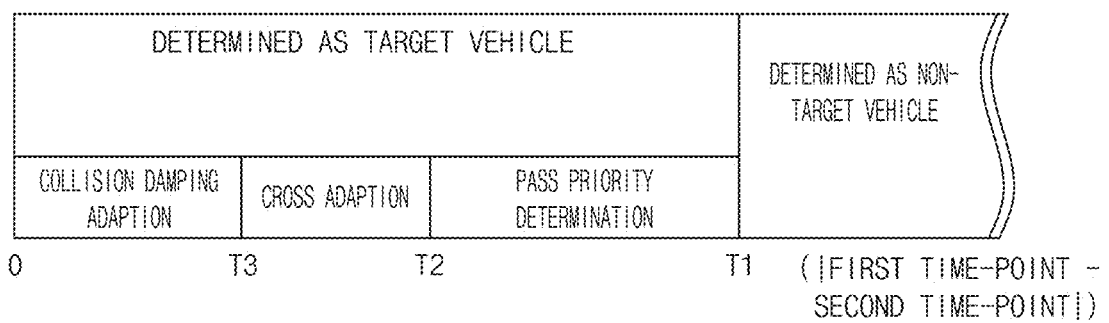
FIG. 5 is a diagram to illustrate an operation of an adaptive route determination module according to one embodiment of the present disclosure.

FIG. 5 is a diagram for illustrating an operation of the adaptive route determination module 900 according to one embodiment of the present disclosure.

As described above with reference to FIG. 4, when the difference between the first time-point at which the present vehicle (10 of FIG. 2) has passed through the lane link and the second time-point at which the surrounding vehicle has passed through the lane link is smaller than or equal to the first time duration T1, the target determination module 600 may determine the surrounding vehicle as the target vehicle. When there is no change in the target vehicle's driving route, the time-point at which the target vehicle has passed through the lane link may also be referred to as the second time-point.

After the target vehicle is determined, the adaptive route determination module 900 may determine the adaptive driving route of the present vehicle, based on the difference between the first time-point at which the present vehicle has passed the lane link and the second time-point at which the target vehicle has passed the lane link. The first time-point and the second time-point may be calculated based on the second precise map information.

According to one embodiment, the adaptive driving route determination method as performed by the adaptive route determination module 900 may vary based on the difference between the first time-point and the second time-point. When the difference between the first time-point and the second time-point is smaller than the second time duration T2, the adaptive route determination module 900 may determine the adaptive driving route of the present vehicle 10 while not determining the pass priority of each of the present vehicle 10 and the target vehicle. The adaptive driving route may refer to the driving route of the present vehicle corresponding to the driving of the target vehicle after the target vehicle is determined.

The adaptive route determination module 900 may determine the adaptive driving route of the present vehicle 10 corresponding to the driving route of the target vehicle, based on the second precise map information, the pass priority of the present vehicle 10, the pass priority of the target vehicle, and the driving route of the target vehicle.

As described with reference to FIG. 4, when the difference between the first time-point and the second time-point is smaller than or equal to the first time duration T1, the target determination module 600 may determine the surrounding vehicle as the target vehicle. The first time duration T1 may be the maximum time duration for which the present vehicle 10 is expected to have a possibility of colliding with the surrounding vehicle.

After the target vehicle is determined, the adaptive route determination module 900 may determine the adaptive driving route of the present vehicle 10.

For example, when the difference between the first time-point and the second time-point is smaller than or equal to the first time duration T1 and is greater than or equal to second time duration T2, the adaptive route determination module 900 may determine the adaptive driving route of the present vehicle 10, based on the second precise map information, the pass priority of the present vehicle 10 and the pass priority of the target vehicle as received from the pass priority determination module 700, and the driving route of the target vehicle as received from the object route creation module 800.

The second time duration T2 may be the minimum time duration for which the pass priority of each of the present vehicle 10 and the target vehicle may be determined. In other words, when the difference between the first time-point and the second time-point is smaller than the second time duration T2, the pass priority determination module 700 may not determine the pass priority of each of the present vehicle 10 and the target vehicle. Further, when the difference between the first time-point and the second time-point is smaller than second time duration T2, the adaptive route determination module 900 may determine the adaptive driving route of the present vehicle 10 without determining the pass priority of each of the present vehicle 10 and the target vehicle.

The second time duration T2 may be smaller than the first time duration T1 and may be greater than a third time duration T3. When the difference between the first time-point and the second time-point is smaller than the second time duration T2 and is greater than or equal to the third time duration T3, the pass priority determination module 700 may not determine the pass priority, but the adaptive route determination module 900 may determine the adaptive driving route of the present vehicle 10 so as to avoid collision with the target vehicle via deceleration or acceleration of the present vehicle 10.

When the difference between the first time-point and the second time-point is smaller than the second time duration T2 and greater than or equal to the third time duration T3, the adaptive route determination module 900 may determine cross adaption as the adaptive driving route.

The cross adaption may mean a driving route along which the present vehicle 10 does not collide with the target vehicle via deceleration or acceleration of the present vehicle. For example, a driving route including maximum acceleration or maximum deceleration of the present vehicle 10 may be a driving route along which the present vehicle 10 and the target vehicle do not collide with each other.

When the difference between the first time-point and the second time-point is smaller than the third time duration T3, the adaptive route determination module 900 may determine collision damping adaption as the adaptive driving route of the present vehicle 10.

The collision damping adaption may mean a driving route that minimizes the impact of the present vehicle 10 due to the collision with the surrounding vehicle. For example, the third time duration T3 may be a minimum time duration for which the present vehicle 10 and the surrounding vehicle do not simultaneously occupy the same area belonging to the lane link. Therefore, when the difference between the first time-point and the second time-point is smaller than the third time duration T3, the collision between the present vehicle 10 and the surrounding vehicle may not be avoided.

For example, when the difference between the first time-point and the second time-point is smaller than the third time duration T3, the present vehicle 10 cannot avoid the collision with the target vehicle via the cross adaption including the maximum acceleration or maximum deceleration of the present vehicle 10.

When the collision between the present vehicle 10 and the surrounding vehicle cannot be avoided, the adaptive route determination module 900 may determine the collision damping adaption to minimize the damage after the collision as the adaptive driving route of the present vehicle 10. For example, the collision damping adaption may include a route along which the present vehicle drives in the opposite direction to an approaching direction toward the surrounding vehicle to minimize the impact thereof. Alternatively, the collision damping adaption may include a route along which the present vehicle turns in the same direction as the surrounding vehicle turns and accelerates in the same manner as the surrounding vehicle does.

Each of the first time duration T1, the second time duration T2, and the third time duration T3 may vary depending on a maximum deceleration speed of the present vehicle 10, a performance of the sensor included in the present vehicle 10, a delay of a system included in the present vehicle 10, or a design safety standard.

According to one embodiment, the second time duration T2 may be determined based on the third time duration T3. For example, one third time duration T3 may be determined for each driving situation based on a maximum deceleration speed of the present vehicle 10, a maximum acceleration speed of the present vehicle 10, the performance of the sensor included in the present vehicle 10, and the delay of the system included in the present vehicle 10. The second time duration T2 may be set to have a difference of a preset time duration from the third time duration T3, based on design safety standards, road driving regulations, and the like. The preset time duration may be a margin time duration for the third time duration T3.

When the difference between the first time-point and the second time-point is smaller than or equal to the first time duration T1 and greater than or equal to the second time duration T2, the adaptive route determination module 900 may create the adaptive driving route of the present vehicle 10.

According to one embodiment, the adaptive driving route of the present vehicle 10 may be created based on the driving route of the present vehicle 10 calculated by the road information combining module 300. Specifically, the adaptive route determination module 900 may create the adaptive driving route of the present vehicle 10 by applying the deceleration or acceleration of the present vehicle 10 to the driving route of the present vehicle 10. The acceleration or deceleration of the present vehicle 10 may be determined based on the pass priority of the present vehicle 10, the pass priority of the target vehicle, and the driving route of the target vehicle.

When the pass priority of the present vehicle 10 is higher than the pass priority of the target vehicle, the adaptive route determination module 900 may determine that the present vehicle 10 occupies or passes through the lane link than the target vehicle does. Further, the adaptive route determination module 900 may receive the driving route of the target vehicle to which deceleration of the target vehicle is applied, from the object route creation module 800.

According to one embodiment, when the pass priority of the present vehicle 10 is higher than the pass priority of the target vehicle, the adaptive route determination module 900 may determine a route along which the present vehicle 10 drives without deceleration as the adaptive driving route.

For example, the adaptive route determination module 900 may determine the driving route of the present vehicle 10 created by the road information combining module 300 as the adaptive driving route of the present vehicle 10. The driving route of the present vehicle 10 may be included in the second precise map information.

When the pass priority of the present vehicle 10 is lower than the pass priority of the target vehicle, the adaptive route determination module 900 may determine that the target vehicle occupies or passes through the lane link than the present vehicle 10 does. Further, the adaptive route determination module 900 may receive, as the driving route of the target vehicle, the driving route of the surrounding vehicle to which deceleration is not applied, from the object route creation module 800.

According to one embodiment, when the pass priority of the present vehicle 10 is lower than the pass priority of the target vehicle, the adaptive route determination module 900 may determine a route to which deceleration of the present vehicle 10 is applied as the adaptive driving route thereof.

For example, the adaptive route determination module 900 may apply the deceleration of the present vehicle 10 to the driving route of the present vehicle 10 created by the road information combining module 300 to determine the adaptive driving route of the present vehicle 10. The driving route of the present vehicle 10 may be included in the second precise map information.

When the target vehicle does not drive according to the driving route of the target vehicle as created in the object route creation module 800, the adaptive route determination module 900 may determine the adaptive driving route of the present vehicle 10, based on the first time-point at which the present vehicle 10 has passed through the lane link and a third time-point at which the target vehicle that does not follow the driving route of the target vehicle has passed through the lane link. After the object route creation module 800 creates a driving route of the target vehicle, the adaptive route determination module 900 may recalculate the third time-point.

According to one embodiment, when the difference between the first time-point and the third time-point is smaller than the second time duration T2 and is greater than or equal to the third time duration T3, the adaptive route determination module 900 may determine the adaptive driving route of the present vehicle 10 so as to avoid collision with the target vehicle via acceleration or deceleration of the present vehicle 10. Exemplarily, the adaptive route determination module 900 may determine the cross adaption as the adaptive driving route of the present vehicle 10.

Further, when the difference between the first time-point and the third time-point is smaller than the third time duration T3, the adaptive route determination module 900 may determine the collision damping adaption as the adaptive driving route of the present vehicle 10.

According to another embodiment, when the target vehicle does not drive according to the driving route of the target vehicle, and even when the difference between the first time-point and the third time-point is greater than or equal to a time duration (e.g., smaller than or equal to the first time duration T1, and larger than or equal to the second time duration T2) for which the pass priority may be determined, the adaptive route determination module 900 may determine the adaptive driving route of the present vehicle 10 without considering the pass priority of each of the present vehicle 10 and the target vehicle. For example, the adaptive route determination module 900 may determine the adaptive driving route of the present vehicle 10 so as to avoid collision with the target vehicle via acceleration or deceleration of the present vehicle 10.

Figure 6:
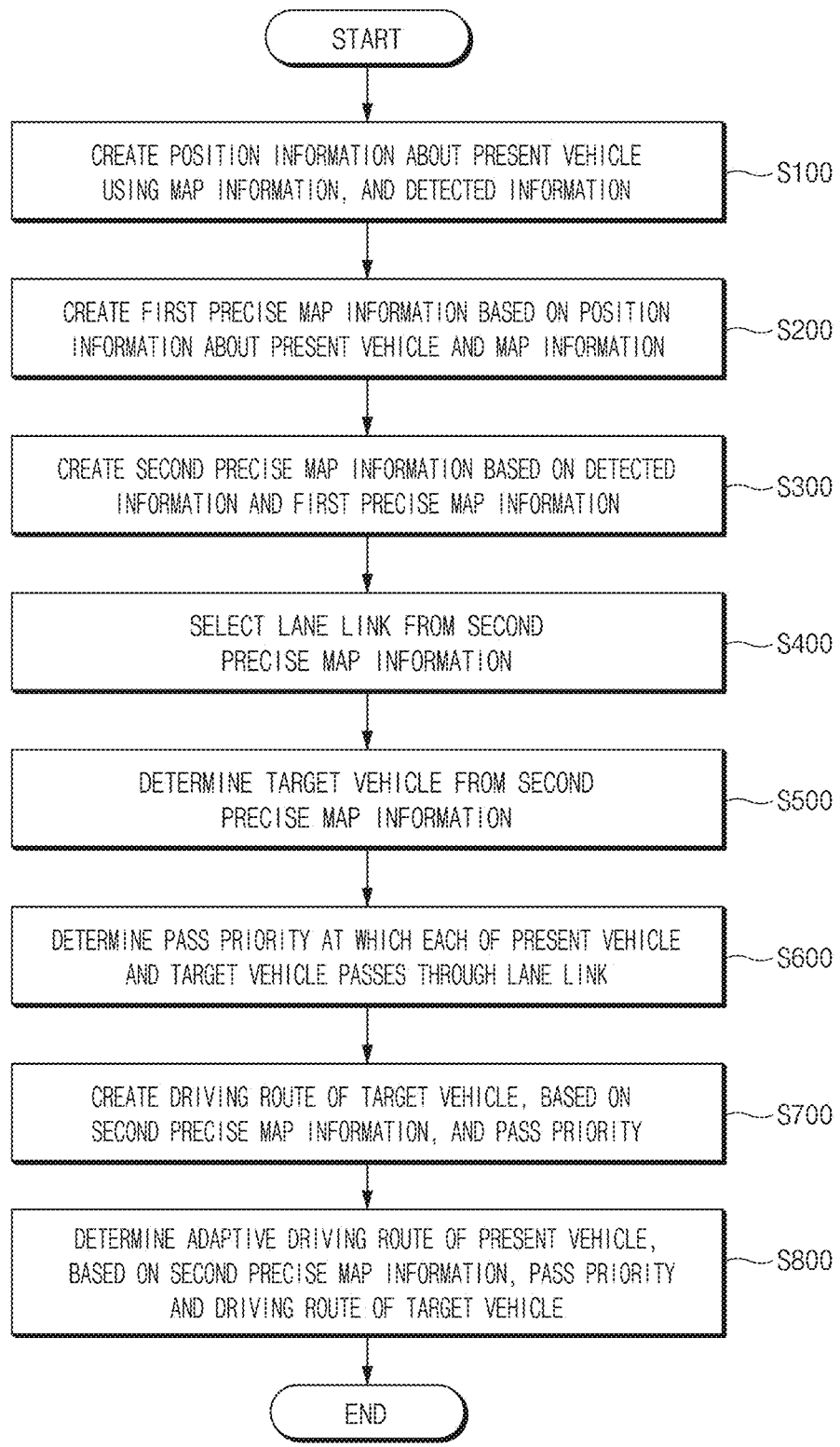
FIG. 6 is a flowchart for illustrating a method for operating a vehicle according to one embodiment of the present disclosure.

FIG. 6 is a flowchart for illustrating a method for operating the vehicle 10 (in FIG. 2) according to one embodiment of the present disclosure.

The position recognition module (200 in FIG. 2) may create the position information of the present vehicle 10 (in FIG. 2) using the map information and the detected information in step S100.

The detected information may be created based on the information collected through the sensor module (100 in FIG. 2) and the controller module (950 in FIG. 2). For example, the detected information may be information that is created based on information about the external environment around the present vehicle 10 and the driving state of the present vehicle 10.

The sensor module (100 in FIG. 2) may collect information using sensors belonging to the vehicle 10, for example, using sensors (110, 120, and 130 in FIG. 2). In addition, the sensor module 100 may create the detected information based on information collected via the sensors 110, 120 and 130 and information received from the controller module 950 belonging to the present vehicle 10.

The controller belonging to the controller module 950 may include, for example, the torque controller that controls the drive torque of the present vehicle 10, the braking controller that controls the braking of the present vehicle 10, and the integrated controller (body control module) that controls an electronic device belonging to the present vehicle 10, and the steering controller that controls the direction of the present vehicle 10. The controllers are general in-vehicle devices for controlling the present vehicle 10, and detailed descriptions thereof are omitted.

The map information may be created via the map creation module 150. The map information may include geographic information. For example, the map information may mean information about an area in which the present vehicle 10 may have a geospatial topology.

The position information created by the position recognition module 200 may be information including position information about the position of each of the present vehicle 10 and the surrounding object around the present vehicle 10.

For example, the position information may include information about the absolute position of each of the present vehicle 10 and the surrounding objects around the present vehicle 10 on the map information. Further, the position information may include relative position information of each of the surrounding objects around the present vehicle 10 with respect to the present vehicle 10. In addition, the position information may include information about the matching percentage between the actual position of the present vehicle 10 and the position of the present vehicle 10 on the map information, and the matching percentage between the actual position of each of the surrounding objects around the present vehicle 10 and the position of each of the surrounding objects around the present vehicle 10 on the map information.

The road information combining module (300 in FIG. 2) may create the first precise map information based on the position information and the map information in step S200.

The first precise map information may include the driving route of the present vehicle 10. The driving route of the present vehicle 10 may include information on the speed, the direction, the to-be-used-road, and the driving line of the present vehicle 10. According to one embodiment, the first precise map information may be created according to the preset period. In other words, the driving route of the present vehicle 10 may be updated according to the preset period.

The object combining module (400 in FIG. 2) may create the second precise map information based on the detected information and the first precise map information in step S300.

The second precise map information may include the driving route of the surrounding vehicle. The surrounding vehicle may mean objects that are vehicles among objects around the present vehicle 10. According to one embodiment, the surrounding vehicle may be limited to a vehicle within the detection range of the sensor module 100 included in the present vehicle 10. The detection range of the sensor module 100 may mean a range in which the sensors belonging to the sensor module 100 may collect information.

The driving route of the surrounding vehicle may include information on the speed, the direction, the to-be-used-road, and the driving line of the surrounding vehicle.

The second precise map information may include information in which the driving routes of the present vehicle 10 and the surrounding vehicle are indicated on the map information.

The lane link determination module (500 in FIG. 2) may select the lane link from the second precise map in step S400.

The lane link may mean a point where the first lane belonging to the driving route of the present vehicle 10 and the second lane belonging to the driving route of the surrounding vehicle intersect each other or join each other.

The first lane and the second lane intersecting each other or joining each other may mean that at least portion of the driving route of the present vehicle 10 is shared with or coincident with at least portion of the driving route of the surrounding vehicle.

According to one embodiment, the lane link determination module 500 may select all of points where the first lane and the second lane intersect or join each other as lane links.

The target determination module (600 in FIG. 2) may determine the target vehicle from the second precise map in step S500.

The target vehicle may be a surrounding vehicle that may have a possibility of colliding with the present vehicle 10 among the surrounding vehicles passing through the lane link.

According to one embodiment, the target determination module 600 may determine sequentially, whether a surrounding vehicle passing through a lane link which the present vehicle 10 is expected to first reach among a plurality of lane links which the present vehicle 10 passes through based on the driving route of the present vehicle 10 corresponds to the target vehicle, and whether a surrounding vehicle passing through a lane link which the present vehicle 10 is expected to second reach among the plurality of lane links which the present vehicle 10 passes through based on the driving route of the present vehicle 10 corresponds to the target vehicle, and, . . . , whether a surrounding vehicle passing through a lane link which the present vehicle 10 is expected to lastly reach among the plurality of lane links which the present vehicle 10 passes through based on the driving route of the present vehicle 10 corresponds to the target vehicle.

In one form, the target determination module 600 may determine the possibility of collision based on the lane link pass-through time-point of each of the present vehicle 10 and the surrounding vehicle. For example, the time-point at which the present vehicle 10 has passed through the lane link is the first time-point, and the time-point at which the surrounding vehicle has passed through the lane link is the second time-point. When the difference between the first time-point and the second time-point is smaller than or equal to the first time duration, the target determination module 600 may determine the surrounding vehicle as the target vehicle.

The pass priority determination module (700 of FIG. 2) may determine the lane link pass priority of each of the present vehicle and the target vehicle, based on the second precise map information in step S600.

The pass priority may mean a right to first pass through the lane link. The pass priority may vary depending on the type of the lane link, the vehicle's entry state into the lane link, the vehicle's driving road, and the traffic signal state about the lane link.

The second precise map information may include information on the type of the lane link, the entry state of the vehicle into the lane link, the driving road of the vehicle, and the traffic signal state about the lane link.

The object route creation module (800 in FIG. 2) may create the driving route of the target vehicle based on the second precise map information, the pass priority of the present vehicle, and the pass priority of the target vehicle step S700.

The object route creation module 800 may create the driving route of the target vehicle, based on the pass priority of the present vehicle 10 and the pass priority of the target vehicle.

According to one embodiment, the object route creation module 800 may create the driving route of the target vehicle, based on the driving route of the surrounding vehicle created by the object combining module 400, based on the pass priority of each of the present vehicle and the target vehicle, and based on the deceleration or acceleration of the target vehicle.

When the pass priority of the present vehicle 10 is higher than the pass priority of the target vehicle, the object route creation module 800 may determine that the present vehicle 10 occupies or passes through the lane link than the target vehicle does. Further, the object route creation module 800 may predict that the target vehicle will decelerate so that the present vehicle 10 may first pass through the lane link.

When the pass priority of the present vehicle 10 is lower than the pass priority of the target vehicle, the object route creation module 800 may determine that the target vehicle occupies or passes through the lane link than the present vehicle 10 does. Further, the object route creation module 800 may predict that the present vehicle 10 will decelerate so that the target vehicle may first pass through the lane link.

When the pass priority of the present vehicle 10 is higher than the pass priority of the target vehicle, the object route creation module 800 may create the driving route of the target vehicle, based on the deceleration of the target vehicle applied to the driving route of the surrounding vehicle contained in the second precise map information.

Further, when the pass priority of the present vehicle 10 is lower than the pass priority of the target vehicle, the object route creation module 800 may create the driving route of the surrounding vehicle contained in the second precise map information as the driving route of the target vehicle.

The adaptive route determination module (900 in FIG. 2) may determine the adaptive driving route of the present vehicle 10 corresponding to the driving route of the target vehicle, based on the second precise map information, the pass priority of the present vehicle 10, the pass priority of the target vehicle, and the driving route of the target vehicle in step S800.

The adaptive route determination module 900 may determine the adaptive driving route of the present vehicle 10 based on the difference between the first time-point at which the present vehicle 10 has passed the lane link and the second time-point at which the target vehicle has passed the lane link.

When the difference between the first time-point at which the present vehicle 10 has passed through the lane link and the second time-point at which the target vehicle has passed through the lane link is smaller than a preset time duration (e.g., the second time duration (T2 in FIG. 5)), the adaptive route determination module 900 may omit the pass priority determination step S600 related to the present vehicle 10 and the target vehicle, and the driving route of the target vehicle creation step S700 and may determine immediately the adaptive driving route of the present vehicle 10. In this case, the adaptive driving route of the present vehicle 10 may be, for example, the cross adaption or the collision damping adaption.

Further, when the target vehicle does not drive according to the driving route of the target vehicle created by the object route creation module 800, the adaptive route determination module 900 may determine the adaptive driving route of the present vehicle 10, based on the difference between the first time-point at which the present vehicle 10 has passed through the lane link and the third time-point at which the target vehicle that does not follow the driving route of the target vehicle has passed through the lane link.

The adaptive route determination module 900 may transmit the adaptive driving route to the controller module 950, based on the determined adaptive driving route of the present vehicle 10. The controller module 950 may output the control parameters to be used for the controllers belonging to the controller module 950, based on the received adaptive driving route.

FIGS. 7A to 7E specifically show a pass priority determination method, based on a type of a lane link according to one embodiment of the present disclosure.

FIGS. 8A to 8E show a situation in which the pass priorities of vehicles compete with each other, based on a lane link type according to one embodiment of the present disclosure.

Referring to FIGS. 7A to 7E, the pass priority determination step S600 related to the present vehicle and the target vehicle of FIG. 6 may be specifically described.

Further, a specific case in which the determination method of FIGS. 7A to 7E is used may be described with reference to FIGS. 8A to 8E.

The pass priority determination module (700 in FIG. 2) may determine whether each of the pass priority of the target vehicle and the pass priority of the target vehicle has been determined, based on the difference between the first time-point at which the present vehicle 10 has passed the lane link and the second time-point at which the target vehicle has passed the lane link.

When the difference between the first time-point and the second time-point is smaller than or equal to the first time duration and greater than or equal to the second time duration, the pass priority determination module 700 may determine the pass priority of the present vehicle 10 and the pass priority of the target vehicle.

The pass priority determination module 700 may determine the pass priority of the present vehicle 10 and the pass priority of the target vehicle based on the second precise map information. The second precise map information may include at least one of type information about the lane link, entry state information of the vehicle into the lane link, driving road information of the vehicle, and traffic signal information about the lane link.

Figure 7A:
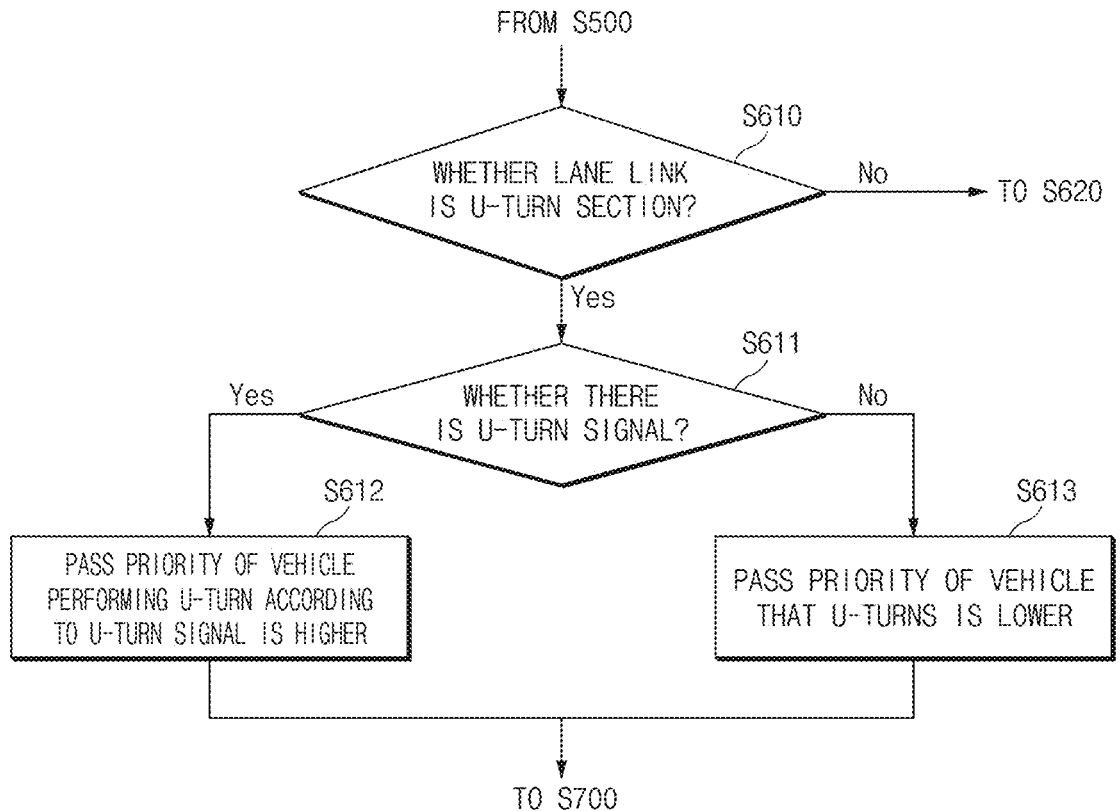

Referring to FIG. 7A, the pass priority determination module 700 may determine whether the lane link is a U-turn section S610. The pass priority determination module 700 may determine whether the lane link is the U-turn section, based on the type information about the lane link.

When the lane link is not the U-turn section, the method may proceed to a step of determining the type of the lane link (NO flow of S610).

When the lane link is the U-turn section (YES flow of S610), the pass priority determination module 700 may determine whether there is a U-turn signal, based on the second precise map information in step S611. The U-turn signal may refer to, for example, a signal instructing a U-turn of the vehicle when the corresponding signal is turned on. For example, regarding the lane link in which the U-turn is permitted while a walking signal is turned on, the walking signal may act as the U-turn signal.

When there is the U-turn signal (YES flow of S611), the pass priority determination module 700 may determine that the pass priority of the vehicle performing the U-turn according to the U-turn signal is higher than the pass priority of each of other vehicles in step S612.

On the contrary, when there is no U-turn signal (NO flow of S611), the pass priority determination module 700 may determine that the pass priority of the vehicle that U-turns without the U-turn signal is lower than the pass priority of each of the other vehicles in step S613.

After determining the pass priority, the method may proceed to a step (S700 of FIG. 6) to create the driving route of the target vehicle.

Figure 8A:
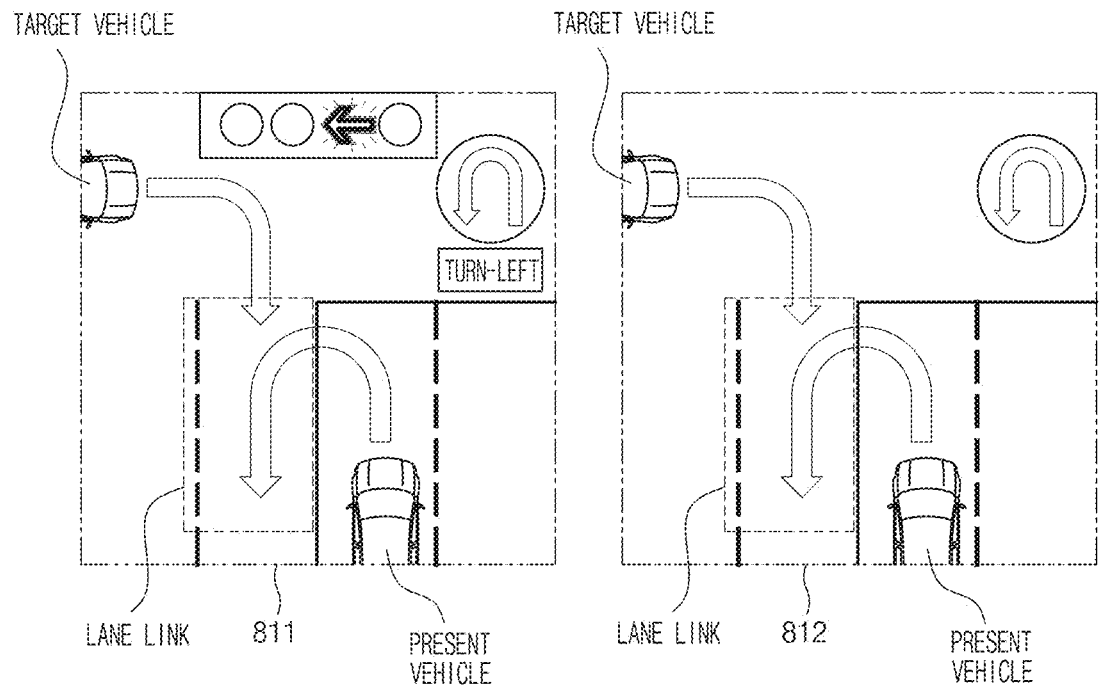
FIGS. 8A to 8E show a situation in which pass priorities of the vehicles compete with each other based on a lane link type according to one embodiment of the present disclosure.

Referring to FIG. 8A, a first U-turn case 811 in which a vehicle U-turns according to a U-turn signal and a second U-turn case 812 without a U-turn signal are shown.

The present vehicle, the target vehicle and the lane link are shown in the first U-turn case 811. The lane link in the first U-turn case 811 may be a lane link using a left turn signal as a U-turn signal. The pass priority determination module 700 may determine that the pass priority of the present vehicle that U-turns according to the left turn signal is higher than the pass priority of the target vehicle that turns right.

The present vehicle, the target vehicle and the lane link are shown in the second U-turn case 812. The lane link in the second U-turn case 812 may be a lane link without a U-turn signal. The pass priority determination module 700 may determine that the pass priority of the present vehicle which U-turns is lower than the pass priority of the target vehicle which turns right.

Figure 7B:
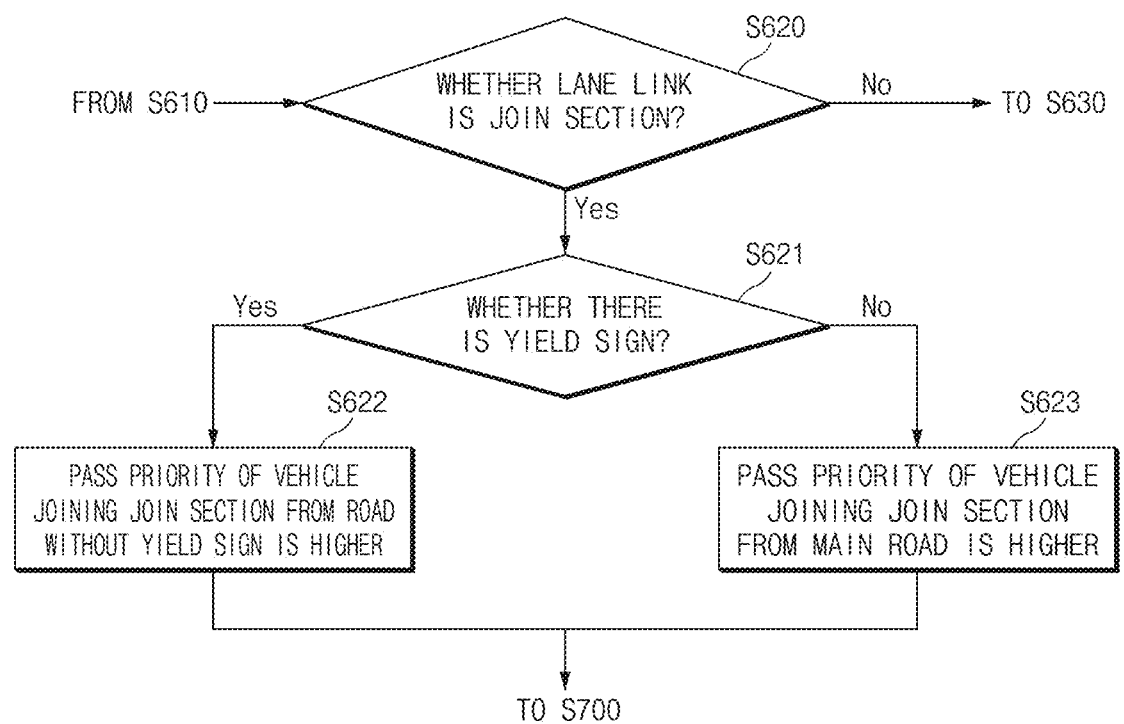

Referring to FIG. 7B, when the lane link is not the U-turn section, the pass priority determination module 700 may determine whether the lane link is a join section in step S620. The pass priority determination module 700 may determine whether the lane link is the join section, based on type information about the lane link.

When the lane link is not the join section, the method may proceed to a step of determining the type of the lane link. (NO flow of S620).

When the lane link is the join section (YES flow of S620), the pass priority determination module 700 may determine whether there is a yield sign, based on the second precise map information in step S621.

When there is the yield sign (YES flow of S621), the pass priority determination module 700 may determine that a priority of a vehicle joining the join section from a road without a yield sign is higher than a pass priority of a vehicle joining the join section from a road with a yield sign in step S622.

When there is no yield sign (NO flow of S621), the pass priority determination module 700 may determine that a pass priority of a vehicle joining the join section from a main road is higher than a pass priority of a vehicle joining the join section from a join road in step S623.

After determining the pass priority, the method may proceed to a step (S700 of FIG. 6) to create the driving route of the target vehicle.

Figure 8B:
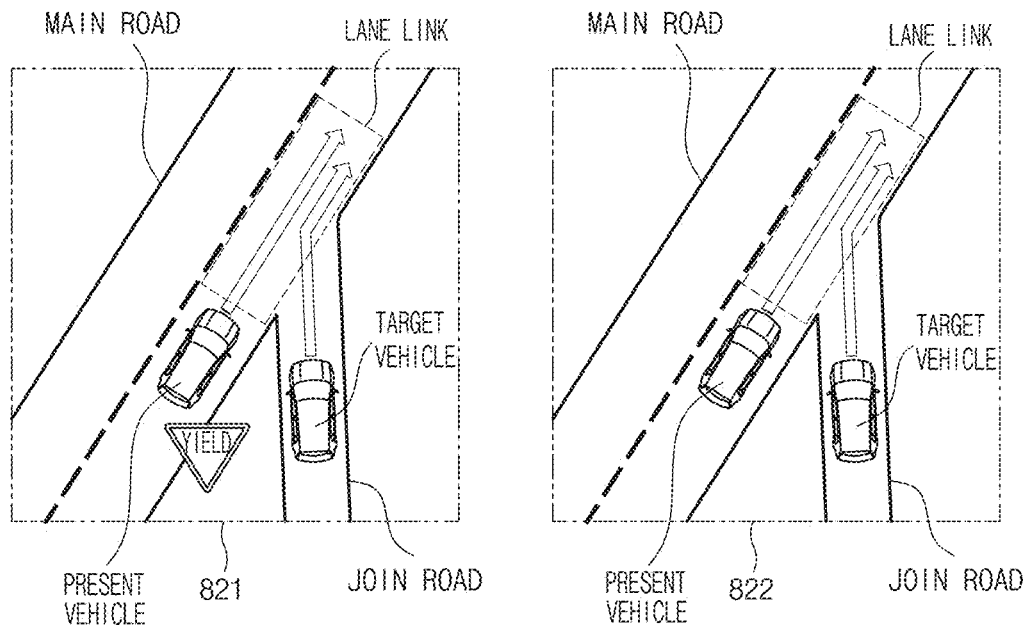

Referring to FIG. 8B, a first join case 821 with a yield sign and a second join case 822 without a yield sign are shown.

The present vehicle driving on the main road, the target vehicle driving on the join road, the yield sign provided on the main road, and the lane link are shown in the first join case 821, In the first join case 821, the yield sign is provided on the main road. Thus, the pass priority determination module 700 may determine that the pass priority of the target vehicle driving on the join road is higher than a pass priority of the present vehicle driving on the main road.

The present vehicle driving on the main road, the target vehicle driving on the join road, and the lane link are shown in the second join case 822.

In the second join case 822, there is no road equipped with a separate yield sign. Thus, the pass priority determination module 700 may determine that the pass priority of the present vehicle driving on the main road is higher than the pass priority of the target vehicle traveling on the join road.

Referring to FIG. 7C, the pass priority determination module 700 may determine whether the lane link is an intersection in step S630. The pass priority determination module 700 may determine whether the lane link is the intersection, based on the type information about the lane link.

When the lane link is not the intersection, the method may proceed to a step of determining the type of the lane link (NO flow of S630).

When the lane link is the intersection (YES flow of S630), the pass priority determination module 700 may determine whether there is a traffic signal, based on the second precise map information in S631. The traffic signal may include, for example, a stop signal, a left turn signal, and a go-straight signal.

When there is the traffic signal (YES flow of S631), the pass priority determination module 700 may determine that the pass priority of the vehicle driving under the traffic signal is higher than the pass priority of the vehicle driving not under the traffic signal in step S632.

On the contrary, when there is no traffic signal (NO flow of S631), the pass priority determination module 700 may determine whether there is a vehicle that has first entered the intersection in step S633.

When there is the vehicle that has first entered the intersection (YES flow of S633), the pass priority determination module 700 may determine that the pass priority of the vehicle which has first entered the intersection is higher than the pass priority of the vehicle which has later entered the intersection in step S634.

When there is no vehicle that has first entered the intersection (NO flow of S633), the pass priority determination module 700 may determine whether the numbers of lines of roads on which the vehicles run are different from each other S635. The absence of the vehicle which has first entered the intersection may mean that the vehicles have entered the intersection at the same time or that any vehicle has not entered the intersection.

The pass priority determination module 700 may determine that a pass priority of a vehicle driving on a road with a larger number of lanes is higher than a pass priority of a vehicle driving on a road with a smaller number of lanes in step S636.

When the numbers of lines of the roads on which the vehicles are driving respectively, are the same (NO flow of S635), the pass priority determination module 700 may determine whether all vehicles on the intersection go straight in step S637.

When all vehicles on the intersection go straight (YES flow of S637), the pass priority determination module 700 may determine that a pass priority of a vehicle driving at a right side around a center of the intersection is higher than a pass priority of a vehicle driving at a left side around the center of the intersection in step S638.

When all vehicles at the intersection do not go straight, (NO flow of S637), the pass priority determination module 700 may determine that a pass priority of a vehicle turning right or going straight is higher than a pass priority of a vehicle turning left in step S639.

After determining the pass priority, the method may proceed to a step (S700 in FIG. 6) of creating the driving route of the target vehicle.

Figure 8C:
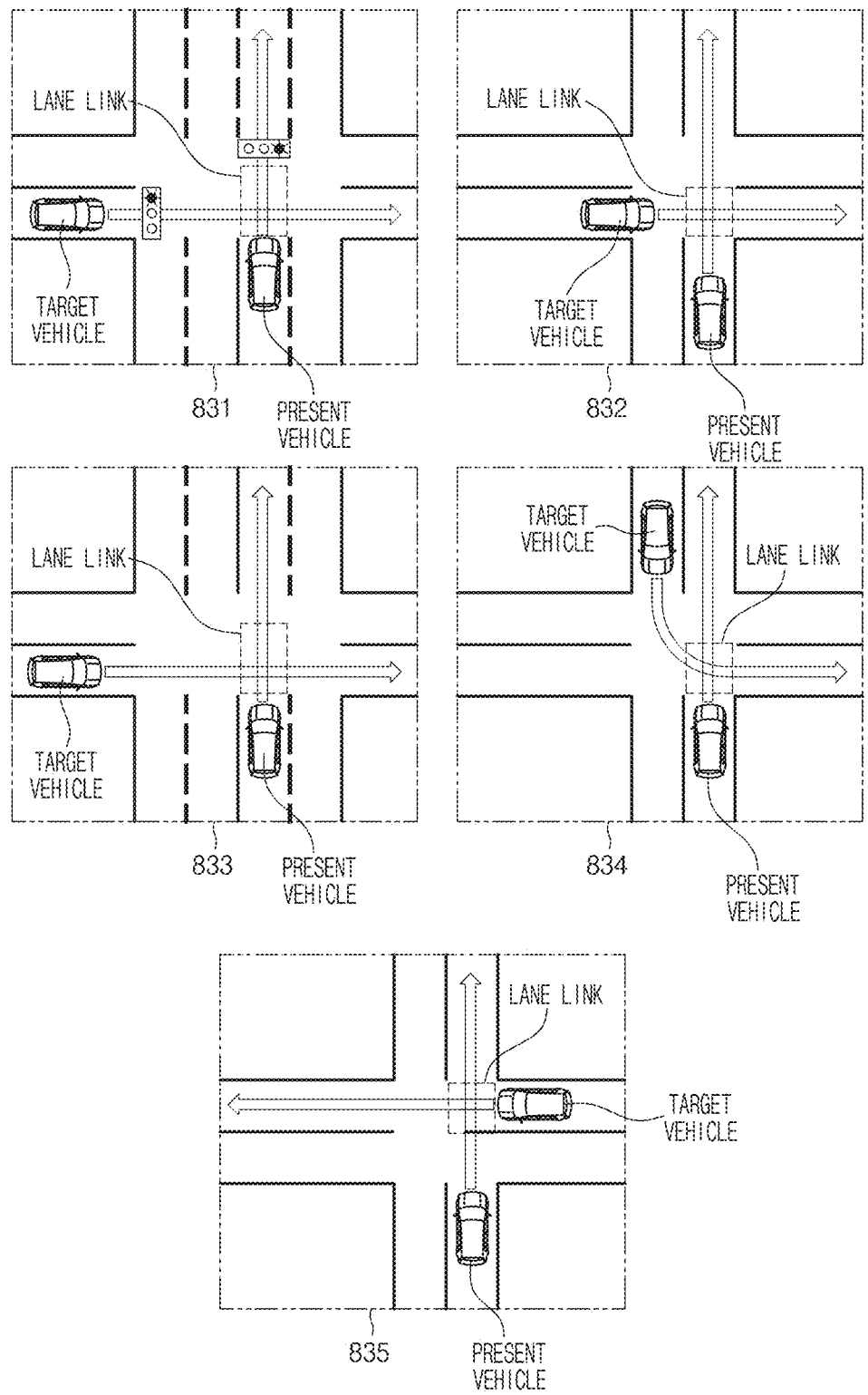

Referring to FIG. 8C, a first intersection case 831 having a traffic signal, a second intersection case 832 in which a vehicle has first entered the intersection, a third intersection case 833 in which the numbers of lines of the roads on which the vehicles drive are different from each other, a fourth intersection case 834 in which a left-turning vehicle and a straight-forward vehicle are present, and a fifth intersection case 835 in which the vehicles go straight are shown.

The present vehicle, the target vehicle, the traffic signal and the lane link are shown in the first intersection case 831. In the first intersection case 831, the traffic signal related to the present vehicle may be a green signal, and the traffic signal related to the target vehicle may be a red signal. The pass priority determination module 700 may determine that the pass priority of the present vehicle proceeding according to the green signal is higher than the pass priority of the target vehicle.

The present vehicle, the target vehicle and the lane link are shown in the second intersection case 832. In the second intersection case 832, the target vehicle may enter the intersection before the present vehicle does. Having entered the intersection may mean that the vehicle is positioned to overlap an area of the intersection. The pass priority determination module 700 may determine that the pass priority of the target vehicle is higher than the pass priority of the present vehicle.

The present vehicle, the target vehicle, and the lane link are shown in the third intersection case 833. In the third intersection case 833, the present vehicle may travel on a round-trip four-lane road, while the target vehicle may travel on a round-trip two-lane road. The pass priority determination module 700 may determine that the pass priority of the present vehicle driving on a road with a larger number of lanes is higher than the pass priority of the target vehicle driving on a road with a smaller number of lanes.

The present vehicle, the target vehicle and the lane link are shown in the fourth intersection case 834. In the fourth intersection case 834, the target vehicle may be a left-turning vehicle, and the present vehicle may be a straight-through vehicle. The pass priority determination module 700 may determine that the pass priority of the present vehicle moving straight ahead is higher than the pass priority of the target vehicle turning left.

The present vehicle, the target vehicle and the lane link are shown in the fifth intersection case 835. In the fifth intersection case 835, both the present vehicle and the target vehicle may be a straight vehicle. The pass priority determination module 700 may determine that the pass priority of the target vehicle which moves straight ahead and which is positioned at a right side around a center of the intersection is higher than the pass priority of the present vehicle which moves straight ahead and which is positioned at a left side around a center of the intersection.

Figure 7D:
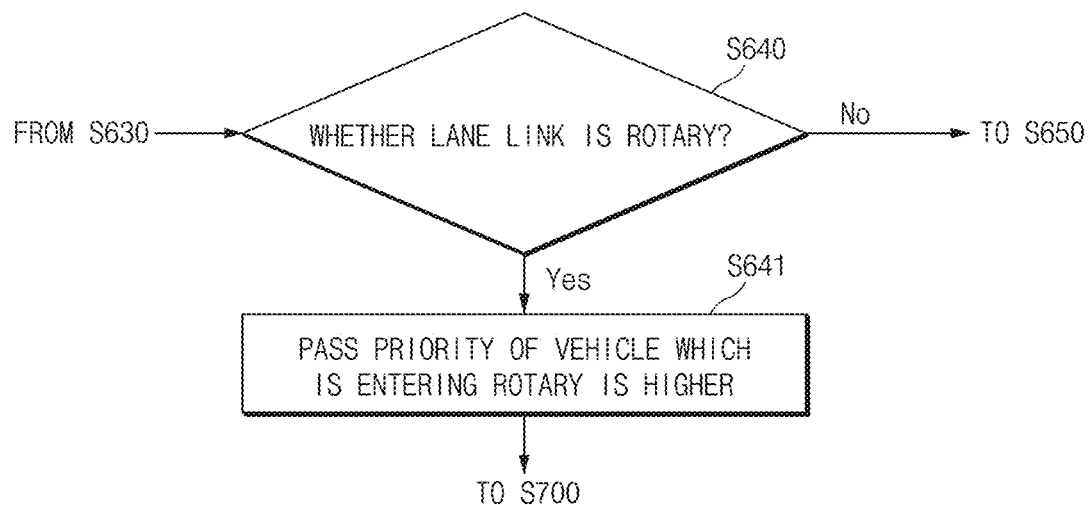

Referring to FIG. 7D, the pass priority determination module 700 may determine whether the lane link is the rotary S640. The pass priority determination module 700 may determine whether the lane link is the rotary, based on the type information about the lane link.

When the lane link is not the rotary (NO flow of S640), the method may proceed to a step of determining the type of the lane link.

When the lane link is the rotary (YES flow of S640), the pass priority determination module 700 may determine that the pass priority of the vehicle which is entering the rotary is higher than the pass priority of the vehicle which has entered the rotary, based on the second precise map information in step S641.

After determining the pass priority, the method may proceed to a step (S700 of FIG. 6) to create the driving route of the target vehicle.

Figure 8D:
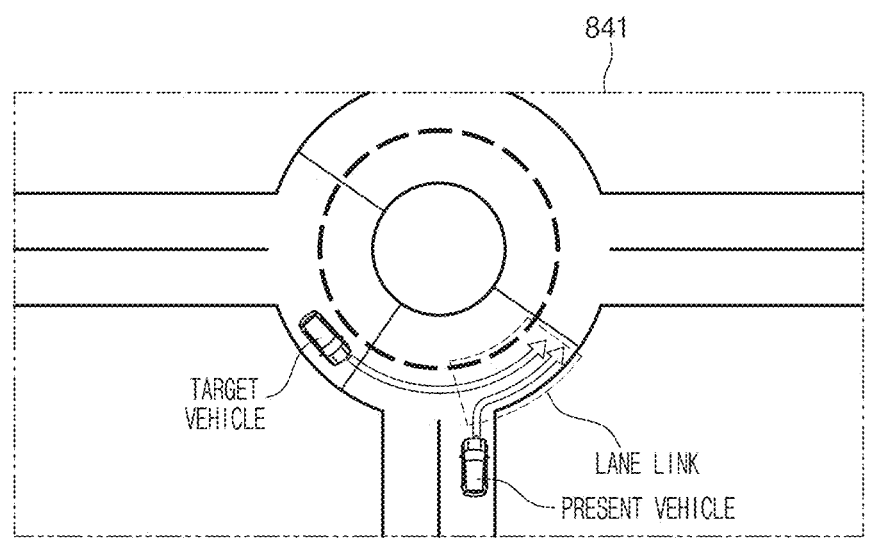

Referring to FIG. 8D, a first rotary case 841 is shown. In the first rotary case 841, the present vehicle, the target vehicle and the lane links are shown. In the first rotary case 841, the present vehicle may be a vehicle which is entering the rotary. The target vehicle may be a vehicle that has entered the rotary. The pass priority determination module 700 may determine that the present vehicle of the first rotary case 841 has a higher pass priority than that of the target vehicle.

Figure 7E:
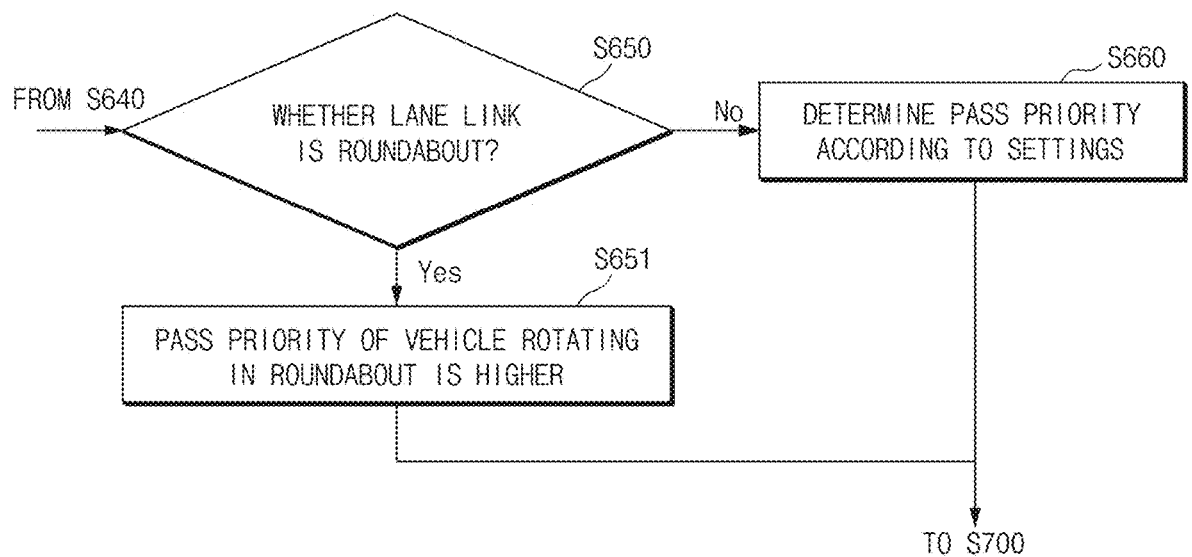

Referring to FIG. 7E, the pass priority determination module 700 may determine whether the lane link is a roundabout in S650. The pass priority determination module 700 may determine whether the lane link is the roundabout, based on type information about the lane link.

When the lane link is not the roundabout (NO flow of S650), the method may proceed to a step S660 of determining the pass priority according to settings.

When the lane link is the roundabout (YES flow of S650), the pass priority determination module 700 may determine that the pass priority of the vehicle rotating in the roundabout is higher than the pass priority of the vehicle entering the roundabout, based on the second precise map information in step S651.

According to one embodiment, the step S660 of determining the pass priority according to the setting may include a step of determining that the pass priority of the present vehicle is higher than the pass priority of the target vehicle. Further, the step S660 of determining pass priority according to the setting may be configured to further include pass priority determination based on a change in traffic laws and a new type of a road.

After determining the pass priority, the method may proceed to a step (S700 of FIG. 6) to create the driving route of the target vehicle.

Figure 8E:
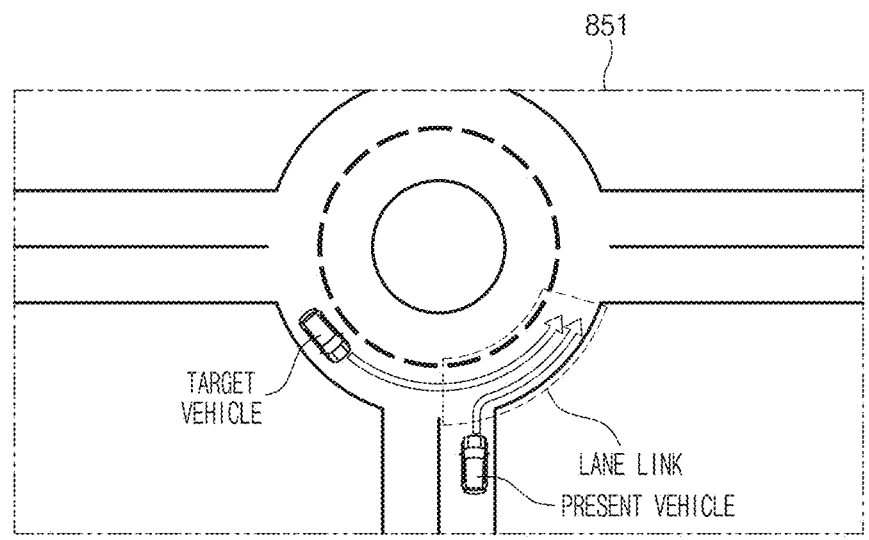

Referring to FIG. 8E, a first roundabout case 851 is shown. The present vehicle, the target vehicle and the lane link are shown in the first roundabout case 851. In the first roundabout case 851, the present vehicle may be a vehicle which is entering the roundabout. Further, the target vehicle may be a vehicle which has entered the roundabout. The vehicle which has entered the roundabout may be a vehicle which is turning within the roundabout. The pass priority determination module 700 may determine that in the first roundabout case 851, the target vehicle has a higher pass priority than that of the present vehicle.

Figure 9:
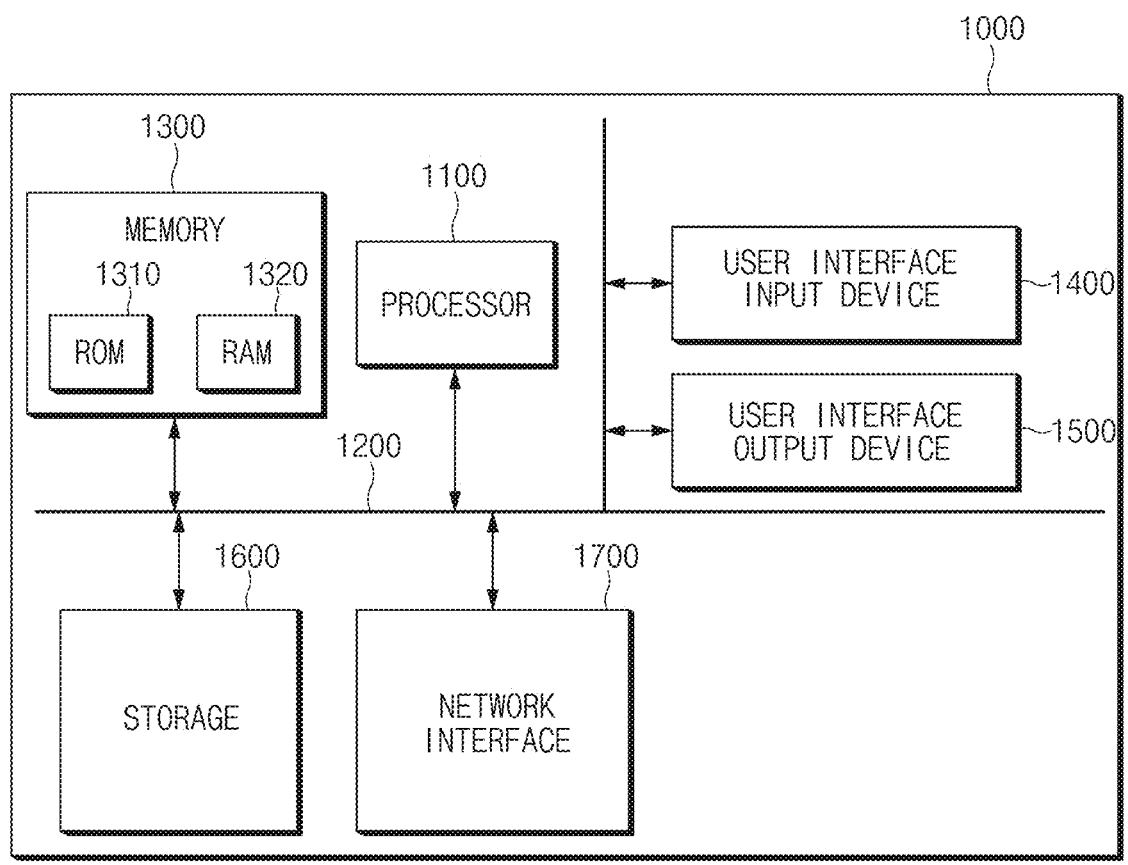
FIG. 9 is a block diagram showing a computing system executing a vehicle operating method that determines a driving route based on a pass priority according to one embodiment of the present disclosure.

FIG. 9 is a block diagram showing a computing system executing a vehicle operating method that determines a driving route, based on a pass priority according to one embodiment of the present disclosure.

Referring to FIG. 9, a computing system 1000 may include at least one processor 1100, a memory 1300, a user interface input device 1400, a user interface output device 1500, storage 1600, and a network interface 1700 which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or nonvolatile storage media. For example, the memory 1300 may include ROM (Read Only Memory) and RAM (Random Access Memory).

Accordingly, the steps of the method or the algorithm described in relation to the embodiments disclosed herein may be directly implemented in hardware, a software module, or a combination thereof as executed by the processor 1100. The software module may reside in a storage medium (that is, the memory 1300 and/or the storage 1600) such as RAM, flash memory, ROM, EPROM, EEPROM, registers, hard disk, a removable disk, a CD-ROM. An exemplary storage medium may be coupled to the processor 1100, and the processor 1100 may read information from, and write information to the storage medium. Alternatively, the storage medium may be integral with the processor 1100. The processor and the storage medium may reside within an application specific integrated circuit (ASIC). The ASIC may reside within a user terminal. Alternatively, the processor and the storage medium may reside as separate components within the user terminal.

The present disclosure provides the vehicle that determines the target vehicle that is likely to collide with the present vehicle and determines the pass priority of each of the present vehicle and the target vehicle.

Further, the vehicle according to the present disclosure may compare the pass priority of the present vehicle and the pass priority of the target vehicle with each other to determine the driving route of the target vehicle and the adaptive driving route of the present vehicle.

The vehicle according to the present disclosure may determine the adaptive driving route of the present vehicle, based on the pass priority. Thus, even when there is a target vehicle that may be likely to collide with the present vehicle, the vehicle may perform driving control based on the pass priority.

Effects of the present disclosure are not limited to the above-mentioned effects, and other effects as not mentioned should be clearly understood by those having ordinary skill in the art from following descriptions.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. A vehicle comprising:
a position recognition module configured to create position information using map information, and detected information collected by at least one sensor, wherein the detected information includes information about the vehicle, and surrounding information around the vehicle;
a road information combining module configured to create first precise map information including a driving route of the vehicle based on the position information and the map information;
an object combining module configured to create second precise map information including a driving route of a surrounding vehicle around the vehicle based on the detected information and the first precise map information;
a lane link determination module configured to select, from the second precise map information, a lane link at which a first lane belonging to the driving route of the vehicle and a second lane belonging to the driving route of the surrounding vehicle intersect or join each other;
a target determination module configured to determine, as a target vehicle, the surrounding vehicle that is likely to collide with the vehicle among surrounding vehicles passing through the lane link based on the second precise map information;
a pass priority determination module configured to determine a pass priority at which each of the vehicle and the target vehicle passes through the lane link based on the second precise map information;
an object route creation module configured to create a driving route of the target vehicle, based on the second precise map information, the pass priority of the vehicle, and the pass priority of the target vehicle;
an adaptive route determination module configured to determine an adaptive driving route of the vehicle corresponding to the driving route of the target vehicle based on the second precise map information, the pass priority of the vehicle, the pass priority of the target vehicle, and the driving route of the target vehicle; and
a controller module configured to control driving of the vehicle based on the adaptive driving route of the vehicle,
wherein the driving route of the surrounding vehicle includes a route along which the surrounding vehicle drives for a preset time duration from a current position of the surrounding vehicle, and
wherein the preset time duration corresponds to a driving route update period of the vehicle,
wherein the adaptive route determination module is configured to determine the adaptive driving route of the vehicle based on the pass priority of the vehicle, the pass priority of the target vehicle, and the driving route of the target vehicle when a difference between a first time-point at which the vehicle passes through the lane link and a second time-point at which the surrounding vehicle passes through the lane link is smaller than or equal to a first time duration and greater than a second time duration, and
wherein the first time duration is a maximum time duration for which the vehicle is expected to be likely to collide with the surrounding vehicle.

2. The vehicle of claim 1, wherein the target determination module is configured to determine the surrounding vehicle as the target vehicle when the difference between the first time-point at which the vehicle passes through the lane link and the second time-point at which the surrounding vehicle passes through the lane link is smaller than the first time duration.

3. The vehicle of claim 2, wherein the adaptive route determination module is configured to determine a driving route in which the vehicle and the target vehicle do not collide each other as an adaptive driving route of the vehicle when the difference between the first time-point and the second time-point is smaller than the second time duration.

4. The vehicle of claim 3, wherein the pass priority determination module is configured to determine the pass priority of the vehicle and the pass priority of the surrounding vehicle when the difference between the first time-point and the second time-point is greater than or equal to the second time duration, and the difference between the first time-point and the second time-point is smaller than or equal to the first time duration.

5. The vehicle of claim 2, wherein the adaptive route determination module is configured to determine a driving route that minimizes a collision impact of the vehicle as the adaptive driving route of the vehicle when the difference between the first time-point and the second time-point is smaller than a third time duration,
wherein the third time duration is a minimum time duration for which the vehicle does not collide with the target vehicle.

6. The vehicle of claim 2, wherein the second precise map information includes at least one of type information about the lane link, entry state information of the vehicle entering into the lane link, driving road information about the vehicle, or traffic signal information about the lane link.

7. The vehicle of claim 6, wherein when the lane link is a U-turn section, the pass priority determination module is configured to:
determine that the pass priority of the vehicle that performs a U-turn according to a U-turn signal is higher than a pass priority of each of other vehicles; and
determine that the pass priority of the vehicle that U-turns without the U-turn signal is lower than the pass priority of each of other vehicles.

8. The vehicle of claim 6, wherein when the lane link is a join section, the pass priority determination module is configured to determine that a pass priority of a vehicle joining the join section from a road without a yield sign is higher than a pass priority of another vehicle joining the join section from a road with a yield sign.

9. The vehicle of claim 8, wherein when the yield sign is absent, the pass priority determination module is configured to determine that a pass priority of a vehicle joining the join section from a main road is higher than a pass priority of a vehicle joining the join section from a join road.

10. The vehicle of claim 6, wherein when the lane link is an intersection having a traffic signal, the pass priority determination module is configured to determine that a pass priority of a vehicle driving under the traffic signal is higher than a pass priority of another vehicle driving not under the traffic signal.

11. The vehicle of claim 6, wherein when the lane link is an intersection free of a traffic signal, the pass priority determination module is configured to determine that a pass priority of a vehicle which has first entered the intersection is higher than a pass priority of a vehicle which has later entered the intersection.

12. The vehicle of claim 11, wherein when vehicles enter the intersection at the same time, or any vehicle does not enter the intersection,
the pass priority determination module is configured to determine that a pass priority of a vehicle driving on a road having a larger number of lanes is higher than a pass priority of a vehicle driving on a road having a smaller number of lanes.

13. The vehicle of claim 12, wherein when the vehicles respectively drive on roads having the same number of the lanes,
the pass priority determination module is configured to determine that a pass priority of a vehicle turning right or going straight is higher than a pass priority of a vehicle turning left.

14. The vehicle of claim 12, wherein when a first lane on which a present vehicle drives and a second lane on which the target vehicle drives are perpendicular, and a driving position of the target vehicle is located at right side of driving direction of the present vehicle,
the pass priority determination module is configured to determine that a pass priority of the target vehicle is higher than a pass priority of the present vehicle.

15. The vehicle of claim 6, wherein when the lane link is a roundabout,
the pass priority determination module is configured to determine that a pass priority of a vehicle rotating in the roundabout is higher than a pass priority of another vehicle entering the roundabout.

16. The vehicle of claim 2, wherein when the pass priority of the vehicle is higher than the pass priority of the target vehicle, the object route creation module is configured to apply deceleration of the target vehicle to the second precise map information to create the driving route of the target vehicle.

17. The vehicle of claim 16, wherein the adaptive route determination module is configured to determine the driving route of the vehicle as the adaptive driving route of the vehicle.

18. The vehicle of claim 17, wherein when the target vehicle drives not under the driving route of the target vehicle,
the adaptive route determination module is configured to determine the adaptive driving route of the vehicle, based on a first time-point at which the vehicle passes through the lane link, and a third time-point at which a target vehicle that does not follow the driving route of the target vehicle passes through the lane link.

19. The vehicle of claim 2, wherein when the pass priority of the vehicle is lower than the pass priority of the target vehicle, the object route creation module is configured to create the driving route of the surrounding vehicle contained in the second precise map information as the driving route of the target vehicle.

20. The vehicle of claim 19, wherein the adaptive route determination module is configured to apply deceleration of the vehicle to the second precise map information to determine the adaptive driving route of the vehicle.

21. A method for operating a vehicle, the method comprising:
creating, by a position recognition module, position information using map information, and detected information collected by at least one sensor, wherein the detected information includes information about a present vehicle, and surrounding information around the present vehicle;

creating, by a road information combining module, first precise map information including a driving route of the present vehicle based on the position information and the map information;

creating, by an object combining module, second precise map information including a driving route of a surrounding vehicle around the present vehicle based on the detected information and the first precise map information;

selecting, by a lane link determination module, from the second precise map information, a lane link at which a first lane belonging to the driving route of the present vehicle and a second lane belonging to the driving route of the surrounding vehicle intersect or join each other;

determining, by a target determination module, as a target vehicle, the surrounding vehicle that is likely to collide with the present vehicle among the surrounding vehicles passing through the lane link, based on the second precise map information;

determining, by a pass priority determination module, a pass priority at which each of the present vehicle and the target vehicle passes through the lane link, based on the second precise map information;

creating, by an object route creation module, a driving route of the target vehicle, based on the second precise map information, the pass priority of the present vehicle, and the pass priority of the target vehicle;

determining, by an adaptive route determination module, an adaptive driving route of the present vehicle corresponding to the driving route of the target vehicle, based on the second precise map information, the pass priority of the present vehicle, the pass priority of the target vehicle, and the driving route of the target vehicle;

determining, by the adaptive route determination module, the adaptive driving route of the vehicle based on the pass priority of the vehicle, the pass priority of the target vehicle, and the driving route of the target vehicle when a difference between a first time-point at which the vehicle passes through the lane link and a second time-point at which the surrounding vehicle passes through the lane link is smaller than or equal to a first time duration and greater than a second time duration; and controlling, by a controller module, driving of the vehicle based on the adaptive driving route of the vehicle, wherein the driving route of the surrounding vehicle includes a route along which the surrounding vehicle drives for a preset time duration from a current position of the surrounding vehicle, wherein the preset time duration corresponds to a driving route update period of the vehicle, and wherein the first time duration is a maximum time duration for which the vehicle is expected to be likely to collide with the surrounding vehicle.

* * * * *